(12) United States Patent
Zhang et al.

(10) Patent No.: US 9,609,671 B2
(45) Date of Patent: Mar. 28, 2017

(54) DATA TRANSMISSION METHOD AND SYSTEM, AND DEVICE THEREOF

(71) Applicant: Huawei Technologies Co., Ltd., Shenzhen (CN)

(72) Inventors: Lixue Zhang, Beijing (CN); Zhenxing Hu, Beijing (CN); Yue Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 14/604,282

(22) Filed: Jan. 23, 2015

(65) Prior Publication Data

US 2015/0139153 A1 May 21, 2015

Related U.S. Application Data

(63) Continuation of application No. PCT/CN2012/079041, filed on Jul. 23, 2012.

(51) Int. Cl.
| | |
|---|---|
| *H04W 76/02* | (2009.01) |
| *H04L 12/24* | (2006.01) |
| *H04W 4/00* | (2009.01) |
| *H04W 68/00* | (2009.01) |

(52) U.S. Cl.
CPC ............ *H04W 76/02* (2013.01); *H04L 41/08* (2013.01); *H04W 4/005* (2013.01); *H04W 68/005* (2013.01)

(58) Field of Classification Search
CPC .................................................... H04W 76/02
See application file for complete search history.

(56) References Cited

U.S. PATENT DOCUMENTS

| | | | | |
|---|---|---|---|---|
| 2009/0219861 | A1* | 9/2009 | Higuchi | H04W 68/025 370/328 |
| 2009/0221284 | A1* | 9/2009 | Kim | H04W 68/025 455/426.1 |
| 2009/0310503 | A1* | 12/2009 | Tenny | H04W 68/00 370/252 |
| 2011/0170515 | A1 | 7/2011 | Kim | |

(Continued)

FOREIGN PATENT DOCUMENTS

| | | |
|---|---|---|
| CN | 101998611 A | 3/2011 |
| CN | 102076028 A | 5/2011 |

(Continued)

*Primary Examiner* — Brian D Nguyen
*Assistant Examiner* — Toan Nguyen
(74) *Attorney, Agent, or Firm* — Slater Matsil, LLP

(57) ABSTRACT

A data transmission method receiving a group identifier, a configuration information window length, and an offset between a start point of the configuration information window length and a paging occasion that are sent by a mobility management entity; establishing a public data radio bearer to a terminal corresponding to the group identifier; scrambling configuration information of the public data radio bearer by using a radio network temporary identifier; sending a paging message carrying the group identifier and the radio network temporary identifier to the terminal; sending the scrambled configuration information of the public data radio bearer to the terminal in the configuration information window length; and receiving uplink data transmitted by the terminal on the public data radio bearer.

18 Claims, 14 Drawing Sheets

(56) References Cited

U.S. PATENT DOCUMENTS

| | | | |
|---|---|---|---|
| 2012/0004003 A1 | 1/2012 | Shaheen et al. | |
| 2012/0064932 A1 | 3/2012 | Lim et al. | |
| 2012/0300655 A1* | 11/2012 | Lee | H04W 24/00 370/252 |
| 2013/0015953 A1* | 1/2013 | Hsu | H04W 4/005 340/7.46 |

FOREIGN PATENT DOCUMENTS

| | | |
|---|---|---|
| CN | 102377803 A | 3/2012 |
| CN | 102547867 A | 7/2012 |
| EP | 2658338 A1 | 10/2013 |
| WO | 2008073050 A2 | 6/2008 |
| WO | 2012097690 A1 | 7/2012 |

* cited by examiner

DATA TRANSMISSION METHOD AND SYSTEM, AND DEVICE THEREOF

This application is a continuation of International Application No. PCT/CN2012/079041, filed on Jul. 23, 2012, which is hereby incorporated by reference in its entirety.

TECHNICAL FIELD

The present invention relates to the field of communications, and in particular, to a data transmission method and system, and a device thereof.

BACKGROUND

An objective of a machine to machine (M2M) communication technology is to enable all terminals to have networking and communication capabilities.

The M2M communication technology is integration of a wireless communication technology and an information technology, and may be used for bidirectional communication, for example, information collection over a long distance, parameter setting over a long distance, and instruction sending over a long distance. Therefore, the M2M technology has different application scenarios, such as applications of safety monitoring, automatic selling, and goods tracking.

For remote monitoring services such as an intelligent meter reading service, an intelligent monitoring service for mountain and aquatic environments, and other remote communication services, a great number of wireless terminals are generally required to perform periodic measurement and data reporting, and features of the services of this type can be summarized as follows:

1. the number of terminals is large, and as many as 30000 terminals may exist in a cell;
2. the data volume is small and fixed, for example, the data volume that needs to be transmitted in the intelligent meter reading service is generally smaller than 50 Bytes, and the data volume that needs to be transmitted each time is nearly the same; and
3. the periodicity of a service is obvious.

It is a problem confronting and to be urgently solved by a great many devices on how to improve the data transmission efficiency and better use a current communication network.

In communication architecture of the M2M communication technology, a communication network provides communication between a machine type communication (MTC) application server and an MTC terminal, where the MTC terminal provides data or information for the MTC application server through the communication network, and the MTC application server sends data or an instruction to the MTC terminal through the communication network. The MTC application server stores the data or information of the MTC terminal, and/or stores data or information that is relevant to an MTC terminal group, for providing an MTC service or relevant information. The communication network includes, but is not limited to, a 3rd Generation Partnership Project (3GPP) network (such as a GSM or a UMTS or an SAE system), or may be another non-3GPP network (such as a WiMAX network).

The design of an existing communication network is adapted to H2H communication, and in the M2M communication technology, a communication network adapted to H2H communication is also used to transmit data. In an uplink data transmission process in the M2M communication, multiple interactions exist between an H2H terminal and a network side, where the interactions include: processes of radio resource control (RRC) connection establishment, security mode establishment, data upload, RRC connection release, and so on. Because of the complicated transmission process and a small data volume in the M2M communication, the air interface transmission efficiency is low, for example, an uploaded data volume in the M2M communication is 50 Bytes, and the overall signaling overhead in an entire data upload process is about 258 Bytes, so that the air interface transmission efficiency is 19.3%. Especially, a great many terminals exist in the M2M communication; therefore, the air interface transmission efficiency of the entire communication network is low.

SUMMARY

The present invention provides a data transmission method and system, and a device thereof, which can improve the air interface transmission efficiency of a communication network.

In one aspect, a data transmission method is provided. The method includes receiving a group identifier, a configuration information window length, and an offset between a start point of the configuration information window length and a paging occasion that are sent by a mobility management entity; establishing a public data radio bearer to a terminal corresponding to the group identifier; scrambling configuration information of the public data radio bearer by using a radio network temporary identifier (RNTI); sending a paging message carrying the group identifier and the RNTI to the terminal; sending the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer; and receiving the uplink data transmitted by the terminal on the public data radio bearer.

In another aspect, a data transmission method is provided. The method includes receiving a paging message carrying a group identifier and an RNTI and sent by a network side; determining whether the group identifier is consistent with a pre-obtained group identifier, if yes, calculating, according to an offset between a start point of a configuration information window length and a paging occasion, and the configuration information window length that are pre-obtained, a position range where configuration information of a public data radio bearer appears, and obtaining, from the position range, the configuration information of the public data radio bearer that is sent by the network side; descrambling the obtained configuration information by using the RNTI; configuring a public data radio bearer to the network side according to the descrambled configuration information; and transmitting uplink data on the configured public data radio bearer.

In another aspect, a base station is provided, which includes: an information receiving unit, an establishment unit, a scrambling unit, a paging message sending unit, a configuration information sending unit, and an uplink data receiving unit. The information receiving unit is adapted to receive a group identifier, a configuration information window length, and an offset between a start point of the configuration information window length and a paging occasion that are sent by a mobility management entity. The establishment unit is adapted to establish a public data radio bearer to a terminal corresponding to the group identifier. The scrambling unit is adapted to scramble configuration information of the public data radio bearer by using an RNTI. The paging message sending unit is adapted to send a paging message carrying the group identifier and the RNTI to the terminal. The configuration information sending unit is adapted to send the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer. The uplink data receiving unit is adapted to receive the uplink data transmitted by the terminal on the public data radio bearer.

In another aspect, a terminal is provided, which includes a paging message receiving unit, a determination unit, an obtaining unit, a descrambling unit, a configuration unit, and a transmission unit. The paging message receiving unit is adapted to receive a paging message carrying a group identifier and an RNTI and sent by a network side. The determination unit is adapted to determine whether the group identifier is consistent with a pre-obtained group identifier. The obtaining unit is adapted to, when the determination unit determines that the group identifier is consistent with the pre-obtained group identifier, calculate, according to an offset between a start point of a configuration information window length and a paging occasion, and the configuration information window length that are pre-obtained, a position range where configuration information of a public data radio bearer appears, and obtain, from the position range, the configuration information of the public data radio bearer that is sent by the network side. The descrambling unit is adapted to descramble the obtained configuration information by using the RNTI. The configuration unit is adapted to configure a public data radio bearer to the network side according to the descrambled configuration information. The transmission unit is adapted to transmit uplink data on the configured public data radio bearer.

In another aspect, a data transmission system is provided, which includes a base station and a terminal. The base station includes an information receiving unit, an establishment unit, a scrambling unit, a paging message sending unit, a configuration information sending unit, and an uplink data receiving unit.

The information receiving unit is adapted to receive a group identifier, a configuration information window length, and an offset between a start point of the configuration information window length and a paging occasion that are sent by a mobility management entity. The establishment unit is adapted to establish a public data radio bearer to a terminal corresponding to the group identifier. The scrambling unit is adapted to scramble configuration information of the public data radio bearer by using an RNTI. The paging message sending unit is adapted to send a paging message carrying the group identifier and the RNTI to the terminal. The configuration information sending unit is adapted to send the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer. The uplink data receiving unit is adapted to receive the uplink data transmitted by the terminal on the public data radio bearer.

The terminal includes a paging message receiving unit, a determination unit, an obtaining unit, a descrambling unit, a configuration unit, and a transmission unit. The paging message receiving unit is adapted to receive a paging message carrying a group identifier and an RNTI and sent by a network side. The determination unit is adapted to determine whether the group identifier is consistent with a pre-obtained group identifier. The obtaining unit is adapted to: when the determination unit determines that the group identifier is consistent with the pre-obtained group identifier, calculate, according to an offset between a start point of a configuration information window length and a paging occasion, and the configuration information window length that are pre-obtained, a position range where configuration information of a public data radio bearer appears, and obtain, from the position range, the configuration information of the public data radio bearer that is sent by the network side. The descrambling unit is adapted to descramble the obtained configuration information by using the RNTI. The configuration unit is adapted to configure a public data radio bearer to the network side according to the descrambled configuration information. The transmission unit is adapted to transmit uplink data on the configured public data radio bearer.

In another aspect, a base station includes an output apparatus, a processor, and an input apparatus. The processor is adapted to perform the following steps: receiving a group identifier, a configuration information window length, and an offset between a start point of the configuration information window length and a paging occasion that are sent by a mobility management entity; establishing a public data radio bearer to a terminal corresponding to the group identifier; scrambling configuration information of the public data radio bearer by using an RNTI; sending a paging message carrying the group identifier and the RNTI to the terminal; sending the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer; and receiving the uplink data transmitted by the terminal on the public data radio bearer.

In another aspect, a terminal is provided, which includes: an input apparatus, a processor, and an output apparatus. The processor is adapted to perform the following steps: receiving a paging message carrying a group identifier and an RNTI and sent by a network side; determining whether the group identifier is consistent with a pre-obtained group identifier, if yes, calculating, according to an offset between a start point of a configuration information window length and a paging occasion, and the configuration information window length that are pre-obtained, a position range where configuration information of a public data radio bearer appears, and obtaining, from the position range, the configuration information of the public data radio bearer that is sent by the network side; descrambling the obtained configuration information by using the RNTI; configuring a public data radio bearer to the network side according to the descrambled configuration information; and transmitting uplink data on the configured public data radio bearer.

In another aspect, a data transmission system is provided, which includes a base station and a terminal. The base station includes an output apparatus, a processor, and an input apparatus. The processor is adapted to perform the following steps: receiving a group identifier, a configuration information window length, and an offset between a start point of the configuration information window length and a paging occasion that are sent by a mobility management entity; establishing a public data radio bearer to a terminal corresponding to the group identifier; scrambling configuration information of the public data radio bearer by using an RNTI; sending a paging message carrying the group identifier and the RNTI to the terminal; sending the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer; and receiving the uplink data transmitted by the terminal on the public data radio bearer.

The terminal includes an input apparatus, a processor, and an output apparatus. The processor is adapted to perform the following steps: receiving a paging message carrying a group identifier and an RNTI and sent by a network side; determining whether the group identifier is consistent with a pre-obtained group identifier, if yes, calculating, according to an offset between a start point of a configuration information window length and a paging occasion, and the configuration information window length that are pre-obtained, a position range where configuration information of a public data radio bearer appears, and obtaining, from the position range, the configuration information of the public data radio bearer that is sent by the network side; descrambling the obtained configuration information by using the RNTI; configuring a public data radio bearer to the network side according to the descrambled configuration information; and transmitting uplink data on the configured public data radio bearer.

In the foregoing technical solutions, the group identifier, the configuration information window length, and the offset between the start point of the configuration information window length and the paging occasion that are sent by the mobility management entity are received, the public data radio bearer to the terminal corresponding to the group identifier is established, the configuration information of the public data radio bearer is scrambled by using the RNTI, the paging message carrying the group identifier and the RNTI is sent to a terminal in a paged group, and the scrambled configuration information of the public data radio bearer is sent to the terminal in the configuration information window length. In this way, when receiving the paging message, the terminal can obtain the configuration information, and then transmit the uplink data on the public data radio bearer according to the configuration information, so that in the uplink data transmission process, RRC connection establishment, security mode establishment, and RRC connection release are not required, thereby improving the air interface transmission efficiency of a communication network.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
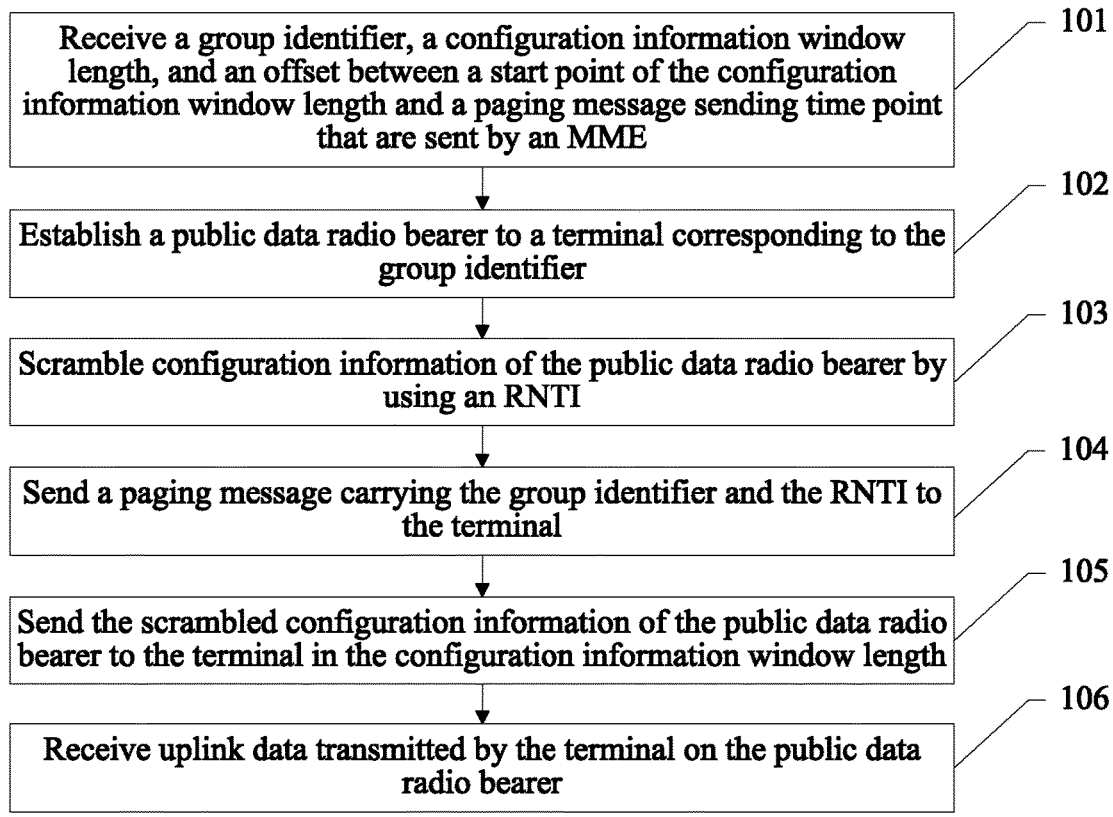
FIG. 1 is a schematic flowchart of an embodiment of a data transmission method according to an embodiment of the present invention.

FIG. 1 is a schematic flowchart of an embodiment of a data transmission method according to an embodiment of the present invention. As shown in FIG. 1, the method includes the following steps 101: Receive a group identifier, a configuration information window length, and an offset between a start point of the configuration information window length and a paging occasion that are sent by a mobility management entity (MME).

It can be understood that, when a terminal in a group is required to transmit uplink data, the terminal receives a configuration information window length, a group identifier of the group, and an offset between a start point of the configuration information window length and a paging occasion that are sent by the MME. A group identifier is a fixed identifier of each terminal group, and specifically, terminals are grouped in advance, and each group has a fixed group identifier. The offset between the start point of the configuration information window length and the paging occasion refers to an offset between occurrence time of the configuration information window length and paging message sending time.

102: Establish a public data radio bearer to a terminal corresponding to the group identifier.

103: Scramble configuration information of the public data radio bearer by using an RNTI (Radio Network Temporary Identifier).

104: Send a paging message carrying the group identifier and the RNTI to the terminal.

As an optional implementation manner, the paging message carrying the group identifier and the RNTI and sent to the terminal is specifically sent to the terminal through a paging channel.

105: Send the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the configuration information from the calculated position range, and transmits uplink data on the public data radio bearer.

It can be understood that, an offset exists between the start point of the configuration information window length and the sending of the paging message in step 104, that is, an offset exists between the start point of the configuration information window length and the paging occasion, and the offset is specifically a time value. It is assumed that, the time of sending the paging message in step 104 is 10:30:10, the offset is 3 S, and the configuration information window length is 5 S; in this way, it can be obtained that the start point of the configuration information window length is 10:30:13, and the configuration information window length is specifically 10:30:13-10:30:18, that is, in step 104, the configuration information of the public data radio bearer may be sent to the terminal in specifically this time period of 10:30:13-10:30:18.

As an optional implementation manner, the configuration information of the public data radio bearer that is sent to the terminal in the configuration information window length may be specifically sent to the terminal through a physical downlink control channel.

Figure 2:
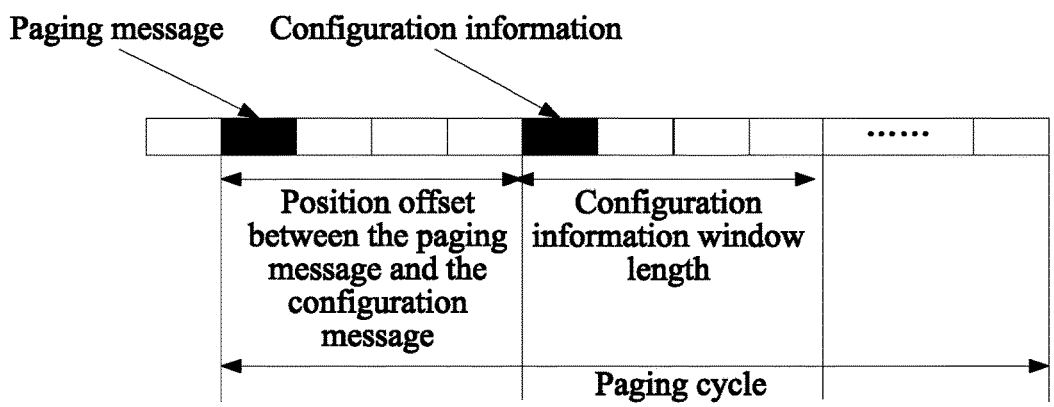
FIG. 2 is an optional schematic diagram of a paging message and configuration information according to an embodiment of the present invention.

As an optional implementation manner, the paging message and the configuration information that are sent in step 104 and step 105 may be specifically shown in FIG. 2, and the offset between the start point of the configuration information window length and the paging occasion, and the configuration information window length are sent by the MME. A paging cycle is preconfigured. In this way, after receiving the paging message, the terminal may calculate, according to the offset between the start point of the configuration information window length and the paging occasion, and the configuration information window length that are pre-obtained by the terminal, the position range where the configuration information of the public data radio bearer appears. The calculated position is specifically a time period, that is, a time period when the configuration information window length appears. Definitely, a position where the configuration information of the public data radio bearer appears may not be fixed, and as shown in FIG. 2, the configuration information of the public data radio bearer may appear in a first unit or appear in a second unit in the configuration information window length, that is, the terminal may obtain the configuration information through multiple times of acquisition.

As an optional implementation manner, step 105 may further include sending the configuration information of the public data radio bearer to the terminal in the configuration information window length for at least once.

As shown in FIG. 2, the configuration information may be sent to the terminal from the first unit in the configuration information window length, then, the configuration information may be further sent to the terminal from the second unit in the configuration information window length, and after that, the configuration information may be further sent to the terminal from a third unit in the configuration information window length until the configuration information window length ends.

After receiving the paging message, the terminal calculates, through the offset between the start point of the configuration information window length and the paging occasion, and the configuration information window length that are pre-obtained by the terminal, the position range where the configuration information of the public data radio bearer appears, obtains the configuration information from the calculated position range, and transmits the uplink data on the public data radio bearer according to the configuration information. The calculated position is specifically a time value, and the terminal may obtain, according to the time value, the configuration information on a bearer transmitting the configuration information, and transmit the uplink data on the public data radio bearer according to the configuration information.

Specifically, after receiving the paging message, the terminal may obtain the group identifier and the RNTI, determine whether the group identifier matches a group identifier obtained and stored by the terminal, if yes, calculate, through the offset between the start point of the configuration information window length and the paging occasion, and the configuration information window length that are pre-obtained by the terminal, the position range where the configuration information of the public data radio bearer appears, obtain the configuration information from the calculated position range, descramble the configuration information by using the obtained RNTI, know a configuration of the public data radio bearer according to the descrambled configuration information, and transmit the uplink data on the public data radio bearer.

106: Receive the uplink data transmitted by the terminal on the public data radio bearer.

As an optional implementation manner, the terminal includes, but is not limited to, an MTC terminal.

After the data sent by the terminal is received in step 106, the data may be transmitted to an MTC application server.

In the foregoing technical solution, the group identifier, the configuration information window length, and the offset between the start point of the configuration information window length and the paging occasion that are sent by the mobility management entity are received, the public data radio bearer to the terminal corresponding to the group identifier is established, the configuration information of the public data radio bearer is scrambled by using the RNTI, the paging message carrying the group identifier and the RNTI is sent to a terminal in a paged group, and the scrambled configuration information of the public data radio bearer is sent to the terminal in the configuration information window length. In this way, when receiving the paging message, the terminal can obtain the configuration information, and then transmit the uplink data on the public data radio bearer according to the configuration information, so that in the uplink data transmission process, RRC connection establishment, security mode establishment, and RRC connection release are not required, thereby improving the air interface transmission efficiency of a communication network.

Figure 3:
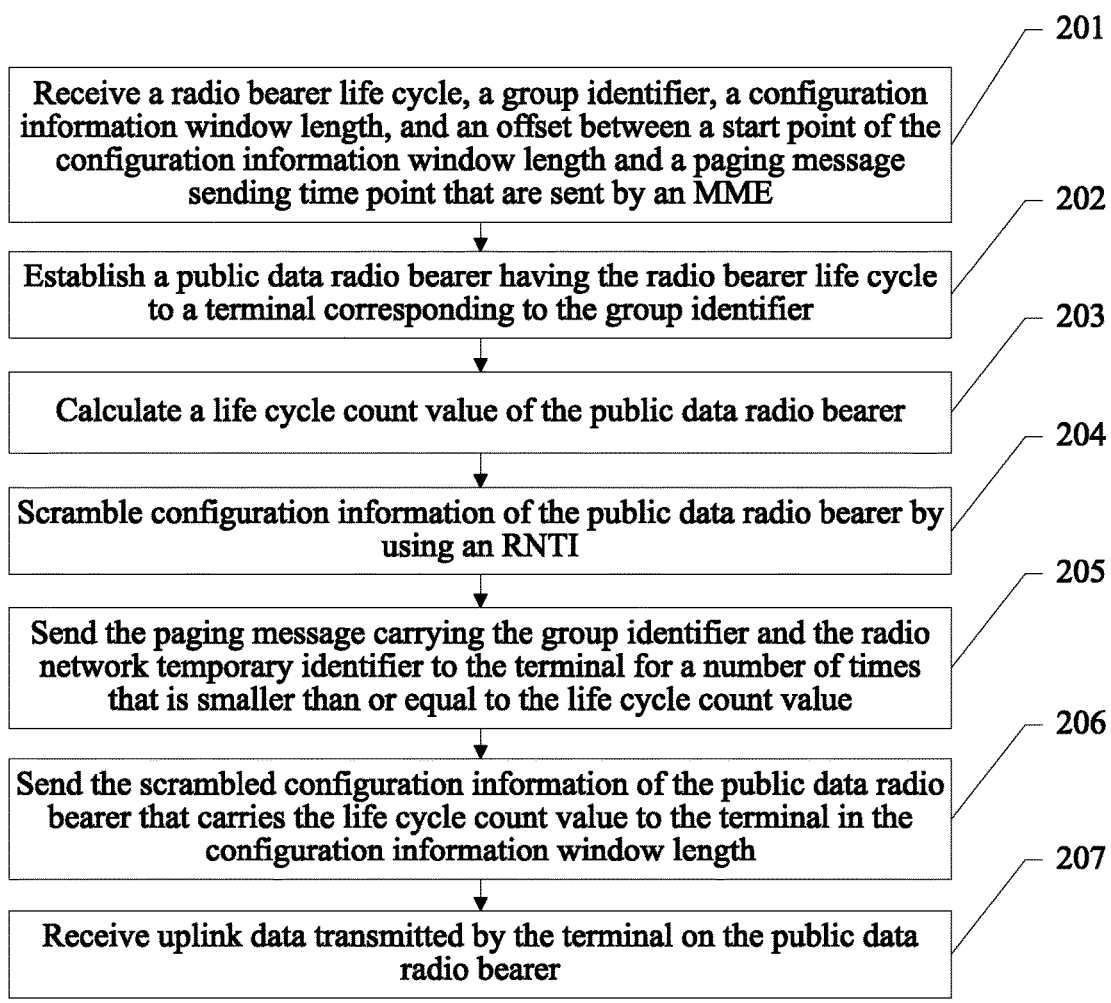
FIG. 3 is a schematic flowchart of another embodiment of a data transmission method according to an embodiment of the present invention.

FIG. 3 is a schematic flowchart of another embodiment of a data transmission method according to an embodiment of the present invention, and as shown in FIG. 3, the method includes the following steps.

201: Receive a radio bearer life cycle, a group identifier, a configuration information window length, and an offset between a start point of the configuration information window length and a paging occasion that are sent by an MME.

202: Establish a public data radio bearer having the radio bearer life cycle to a terminal corresponding to the group identifier.

Optionally, the existence time of the public data radio bearer, which is established in step 202, to the terminal corresponding to the group identifier is limited, and the limited time is specifically the radio bearer life cycle; in this way, it can be ensured that normally, a terminal in a paged group completes uplink data transmission, and the network resources can be further saved. If a terminal that does not complete uplink data transmission exists in the paged group in the radio bearer life cycle, the terminal may complete uplink data transmission by establishing a separate bearer with a network side. The technical solution that the terminal may complete uplink data transmission by establishing a separate bearer with the network side is disclosed knowledge, which is not described in detail herein.

203: Calculate a life cycle count value of the public data radio bearer.

As an optional implementation manner, the life cycle count value of the public data radio bearer that is calculated in step 203 may be specifically calculated through the following formula:

$$DRB\text{LifeTimeCounter}=\text{floor}(DRB\text{LifeTime}/\text{PagingCycle})+1,$$

where the DRB Life Time Counter is the life cycle count value, the floor represents rounding down, the DRB Life Time is a life cycle of the public data radio bearer, the Paging Cycle is a paging cycle and the paging cycle is preconfigured, and the Paging Cycle may be specifically shown in the following formula:

$$\text{PagingCycle}=\min(UE \text{ Specific } DRX, \text{default } DRX),$$

where the min is a minimum value, the UE Specific DRX is a UE specific discontinuous reception period, and the Default DRX is a default discontinuous reception period.

It is assumed that, the radio bearer life cycle sent by the MME is 10 S, and the paging cycle is 3 S, so that the life cycle count value calculated through the foregoing calculation formula is 4.

204: Scramble configuration information of the public data radio bearer by using an RNTI.

205: Send a paging message carrying the group identifier and the RNTI to the terminal for a number of times that is smaller than or equal to the life cycle count value.

Optionally, the paging message and the configuration information of the public data radio bearer are sent to the terminal for multiple times; in this way, it can be effectively ensured that it is more likely for the terminal to receive the paging message and the configuration information of the public data radio bearer.

206: Send the scrambled configuration information of the public data radio bearer that carries the life cycle count value to the terminal in the configuration information window length, where the life cycle count value is a life cycle count value decreased by 1 after the paging message is sent each time, so that after receiving the paging message, the terminal calculates, according to the offset and the configuration information window length that are pre-obtained by the terminal, a position range where the configuration information of the public data radio bearer appears, obtains the configuration information from the position range, and transmits uplink data on the public data radio bearer.

Optionally, when the paging message is sent to the terminal for multiple times in step 205, and the offset between the start point of the configuration information window length and the paging occasion is unchanged, each time the paging message is sent in step 205, a corresponding configuration information window length exists, and in step 206, the configuration information of the public data radio bearer that carries the life cycle count value of the public data radio bearer is sent to the terminal in the configuration information window length. That is to say, in step 206, the configuration information of the public data radio bearer that carries the life cycle count value of the public data radio bearer is sent to the terminal in multiple configuration information window lengths.

As an optional implementation manner, in step 206, the sending the configuration information of the public data radio bearer that carries the life cycle count value of the public data radio bearer to the terminal in the configuration information window length may specifically include sending the scrambled configuration information of the public data radio bearer to the terminal in the configuration information window length for at least once.

Optionally, the scrambled configuration information of the public data radio bearer that carries the life cycle count value of the public data radio bearer may be specifically sent to the terminal in the configuration information window length for at least once.

Figure 4:
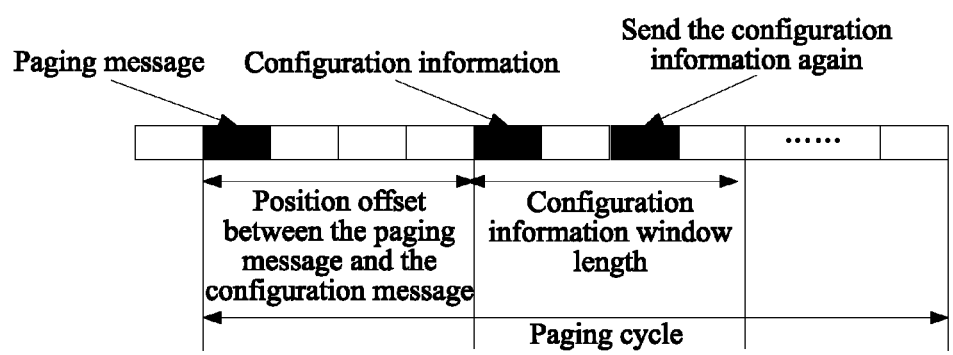
FIG. 4 is another optional schematic diagram of a paging message and configuration information according to an embodiment of the present invention.

Details are shown in FIG. 4, and the configuration information of the public data radio bearer is sent in the configuration information window length in FIG. 4 for at least once.

Optionally, the configuration information of the public data radio bearer carries the life cycle count value of the public data radio bearer, and the life cycle count value of the public data radio bearer refers to a life cycle count value decreased by 1 after the paging message is sent each time. The terminal may be informed of the life cycle count value of the public data radio bearer through the life cycle count value being decreased by 1 after the paging message is sent each time. It is assumed that, the life cycle count value of the public data radio bearer that is calculated in step 204 is 4, so that the paging message may be sent to the terminal for at most 4 times in step 205, and similarly, the configuration information of the public data radio bearer may be sent to the terminal in four configuration information window lengths in step 206. The configuration information of the public data radio bearer carries the life cycle count value decreased by 1 after the paging message is sent each time.

In step 204, the paging message and the configuration information are sent for the first time, and the life cycle count value carried in the configuration information is 4. After the paging message and the configuration information are sent for the first time, a terminal that does not complete uplink data transmission exists, so that the paging message and the configuration information are sent for the second time in step 205 and step 206, and the life cycle count value carried in the configuration information is 3. After the paging message and the configuration information are sent for the second time, a terminal that does not complete uplink data transmission exists, so that the paging message and the configuration information are sent again in step 205 and step 206 until the life cycle count value is 0. The life cycle count value being 0 indicates that the life cycle of the public data radio bearer ends. If the life cycle count value is 0 and a terminal that does not complete uplink data transmission exists, the terminal that does not complete uplink data transmission may establish a separate bearer with the network side to complete the uplink data transmission.

In this way, the configuration information of the public data radio bearer is sent in the configuration information window length for at least once, and the terminal may have more chances to obtain the configuration information of the public data radio bearer.

207: Receive the uplink data transmitted by the terminal on the public data radio bearer.

In the foregoing technical solution, based on the above embodiment, the cycle of the established public data radio bearer is limited; in this way, the network resources can be saved, and at the same time, the paging message and the configuration information are sent to the terminal for multiple times in the life cycle of the public data radio bearer, which ensures that it is most likely for the terminal to receive the paging message and the configuration information, and the resource utilization rate is high. The air interface transmission efficiency of a communication network is further improved.

Figure 5:
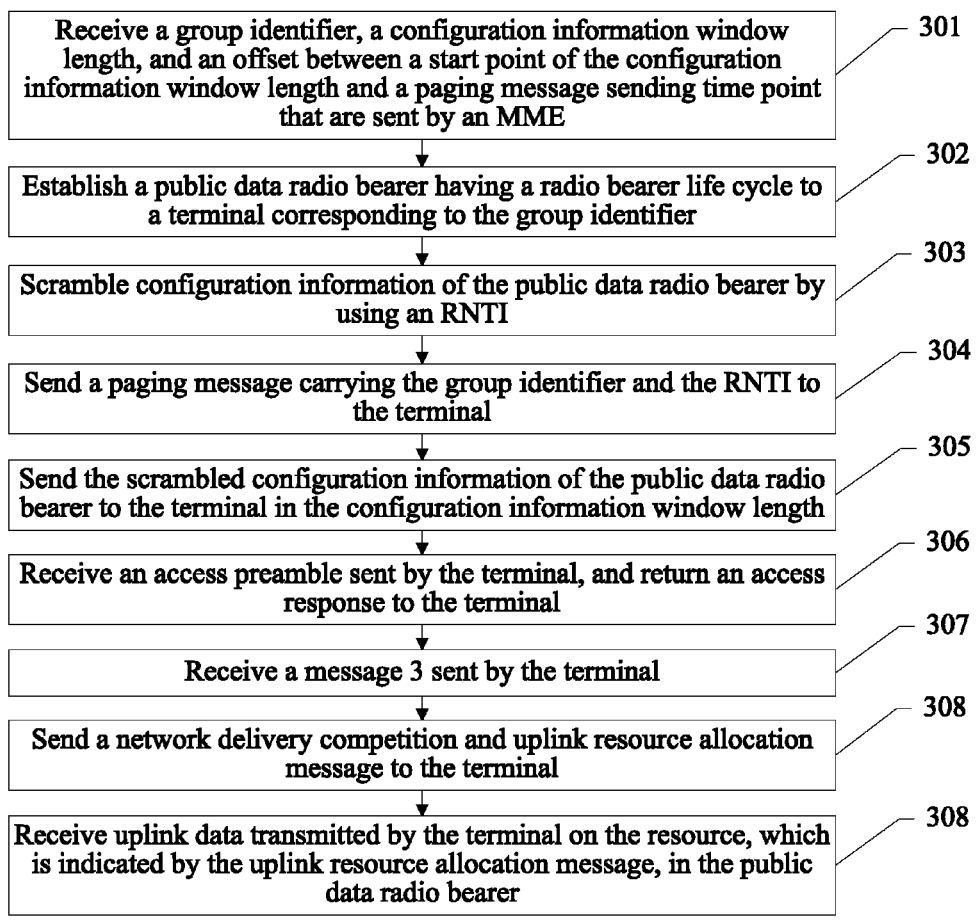
FIG. 5 is a schematic flowchart of another embodiment of a data transmission method according to an embodiment of the present invention.

FIG. 5 is a schematic flowchart of another embodiment of a data transmission method according to an embodiment of the present invention, and as shown in FIG. 5, the method includes the following steps.

301: Receive a group identifier, a configuration information window length, and an offset between a start point of the configuration information window length and a paging occasion that are sent by an MME.

302: Establish a public data radio bearer to a terminal corresponding to the group identifier.

303: Scramble configuration information of the public data radio bearer by using an RNTI.

304: Send a paging message carrying the group identifier and the RNTI to the terminal.

305: Send the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the configuration information from the calculated position range, and transmits uplink data on the public data radio bearer.

306: Receive an access preamble sent by the terminal, and return an access response to the terminal.

When receiving the paging message and a configuration message of the public data radio bearer, the terminal sends an access preamble to a network.

307: Receive a message 3 sent by the terminal, where the message 3 includes the group identifier and a system architecture evolution temporary mobile station identifier (System Architecture Evolution Temporary Mobile Station Identifier, S-TMSI), or the message 3 includes the group identifier and a random number.

After the message 3 is received, which terminals in a group that receive the paging message and the configuration information of the public data radio bearer are known. The S-TMSI and the random number belong to disclosed knowledge, and are not described in detail herein.

As an optional implementation manner, when uplink data volume that needs to be uploaded by the terminal is larger than a default data volume of a network side, the message 3 further includes a buffer status report (Buffer Status Report, BSR), where the BSR is used to indicate an uplink data volume that needs to be uploaded by the terminal.

Specifically, information of the default data volume of the network side is prestored in a server (Home Subscriber Server, HSS), and when the terminal is switched on and is attached to the network, the MME sends the information of the default data volume of the network side to the terminal in advance.

In this implementation manner, the method further includes, when a first message 3 sent by the terminal is received, modifying a data transmission bearer of a core network according to the message 3.

It can be understood that, the data transmission bearer of the core network is modified only according to a BSR in the received first message 3, and when another message 3 is received, the data transmission bearer of the core network is not modified. Therefore, uplink data that needs to be transmitted by terminals in the same group is the same.

The modified data transmission bearer of the core network satisfies the condition that the uplink data transmitted by the terminal is transmitted in the core network.

Definitely, in another situation, when the content included in the message 3 is allowed by subscription data, a data bearer of the core network is not modified, and the modification process is disclosed knowledge and is not described in detail herein.

As an optional implementation manner, step 306 may include receiving, by a media access control protocol data unit (Media Access Control protocol data unit MAC PDU), the message 3 sent by the terminal.

308: Send a network delivery competition and uplink resource allocation message to the terminal, so that the terminal transmits the uplink data on a resource, which is indicated by the uplink resource allocation message, in the public data radio bearer.

After receiving the paging message, the terminal obtains the group identifier and the RNTI, determines whether the group identifier matches a group identifier obtained and stored by the terminal, if yes, calculates, through the offset between the start point of the configuration information window length and the paging occasion, and the configuration information window length that are pre-obtained by the terminal, the position range where the configuration information of the public data radio bearer appears, obtains the configuration information from the calculated position range, descrambles the configuration information by using the obtained RNTI, knows a configuration of the public data radio bearer according to the descrambled configuration information, and when receiving the delivery competition and uplink resource allocation message, may transmit the uplink data on the resource, which is indicated by the uplink resource allocation message, in the public data radio bearer.

309: Receive the uplink data transmitted by the terminal on the resource, which is indicated by the uplink resource allocation message, in the public data radio bearer.

In the foregoing technical solution, based on the above embodiment, it is added that the access preamble sent by the terminal is received, the access response is returned to the terminal, the message 3 sent by the terminal is received, and the network delivery competition and uplink resource allocation message is sent to the terminal, so as to indicate a resource used by each terminal receiving the paging message and the configuration information to transmit the uplink data on the public data radio bearer. Compared with the prior art, in this embodiment, RRC connection release and RRC connection reconfiguration are not required, and in RRC connection establishment, a resource used by the terminal to transmit the uplink data on the public data radio bearer is indicated; in this way, a resource of the public data radio bearer is reasonably allocated, and the air interface transmission efficiency of a communication network is improved.

Figure 6:
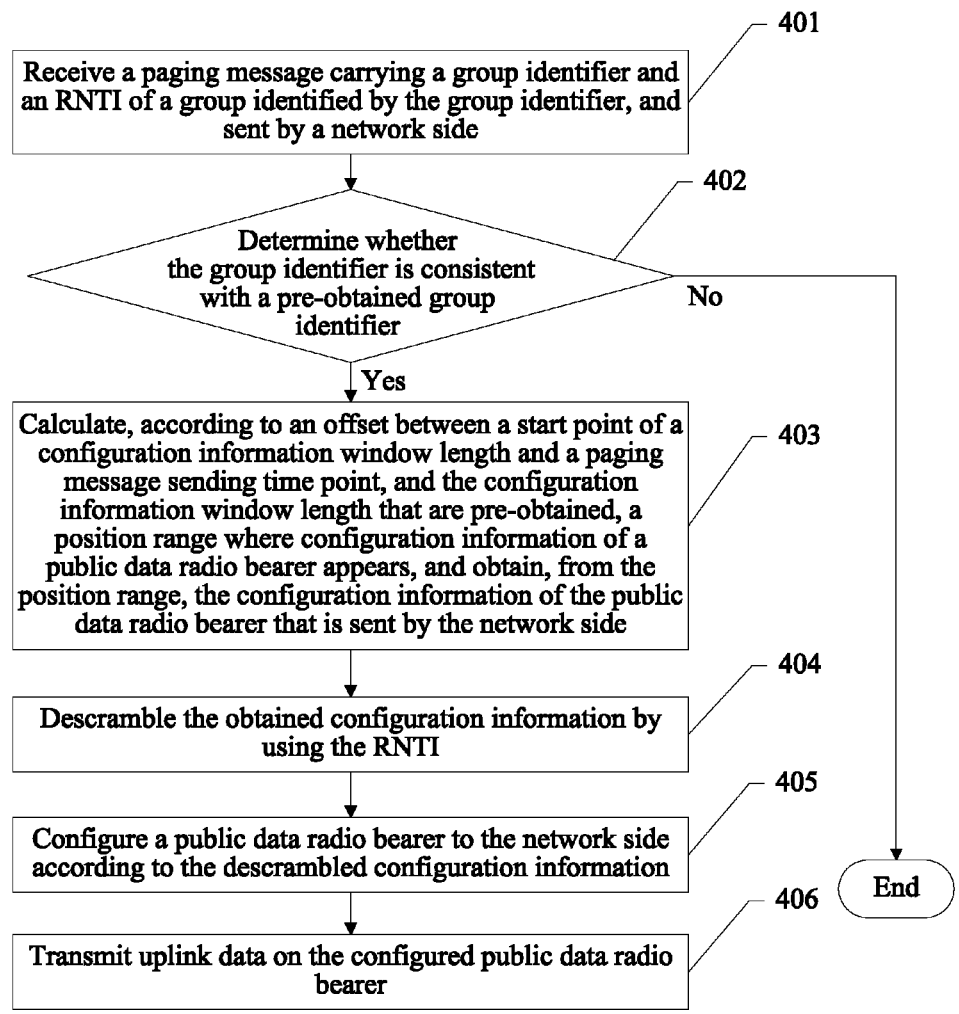
FIG. 6 is a schematic flowchart of an embodiment of another data transmission method according to an embodiment of the present invention.

FIG. 6 is a schematic flowchart of an embodiment of another data transmission method according to an embodiment of the present invention, and as shown in FIG. 6, the method includes the following steps.

401: Receive a paging message carrying a group identifier and an RNTI and sent by a network side.

It should be noted that, after the RNTI is received, the RNTI is stored, and subsequently, for a received scrambled message sent by the network side, the received scrambled message is descrambled by using the RNTI. That is to say, a message that is sent by the network side to a terminal corresponding to the group identifier and needs to be scrambled is scrambled by using the RNTI.

402: Determine whether the group identifier is consistent with a pre-obtained group identifier, if yes, perform step 403, that is, calculate, according to an offset between a start point of a configuration information window length and a paging occasion, and the configuration information window length that are pre-obtained, a position range where configuration information of a public data radio bearer appears, and obtain, from the position range, the configuration information of the public data radio bearer that is sent by the network side; and if not, end the procedure.

It can be understood that, before step 401, the group identifier, and the offset between the start point of the configuration information window length and the paging occasion are obtained.

As an optional implementation manner, the group identifier, and the offset between the start point of the configuration information window length and the paging occasion may be obtained through an initial attachment Attach procedure. The Attach procedure belongs to disclosed knowledge and is not described in detail herein.

403: Calculate, according to the offset between the start point of the configuration information window length and the paging occasion, and the configuration information window length that are pre-obtained, the position range where the configuration information of the public data radio bearer appears, and obtain, from the position range, the configuration information of the public data radio bearer that is sent by the network side.

As an optional implementation manner, the position range where the configuration information of the public data radio bearer appears may be specifically shown in FIG. 2 or FIG. 4.

As an optional implementation manner, the position range where the configuration information of the public data radio bearer appears and that is calculated in step 403 may specifically be a position of the configuration information window length, and the network side may send the configuration information of the public data radio bearer on the position of the configuration information window length for multiple times, so that after the position range where the configuration information of the public data radio bearer appears is calculated in step 403, multiple times of acquisition may be performed on the position until the configuration information of the public data radio bearer is obtained.

As an optional implementation manner, the obtaining, on the position calculated in step 403, the configuration information of the public data radio bearer that is sent by the network side may include obtaining, on the calculated position, the configuration information of the public data radio bearer that carries a life cycle count value of the public data radio bearer and is sent by the network side.

In this way, after the configuration information of the public data radio bearer is obtained, a life cycle of the public data radio bearer that is indicated by the configuration information of the public data radio bearer can be known, so that uplink data transmission is completed in the life cycle as soon as possible.

404: Descramble the obtained configuration information by using the RNTI.

405: Configure a public data radio bearer to the network side according to the descrambled configuration information.

406: Transmit uplink data on the configured public data radio bearer.

In the foregoing technical solution, the paging message and the configuration information of the public data radio bearer that are sent by the network side are obtained, and after the configuration information of the public data radio bearer is descrambled, the public data radio bearer to the network side is configured by using the descrambled configuration information, so as to transmit the uplink data on the public data radio bearer. In this way, in the uplink data transmission process, RRC connection establishment, security mode establishment, and RRC connection release are not required, thereby improving the air interface transmission efficiency of a communication network.

Figure 7:
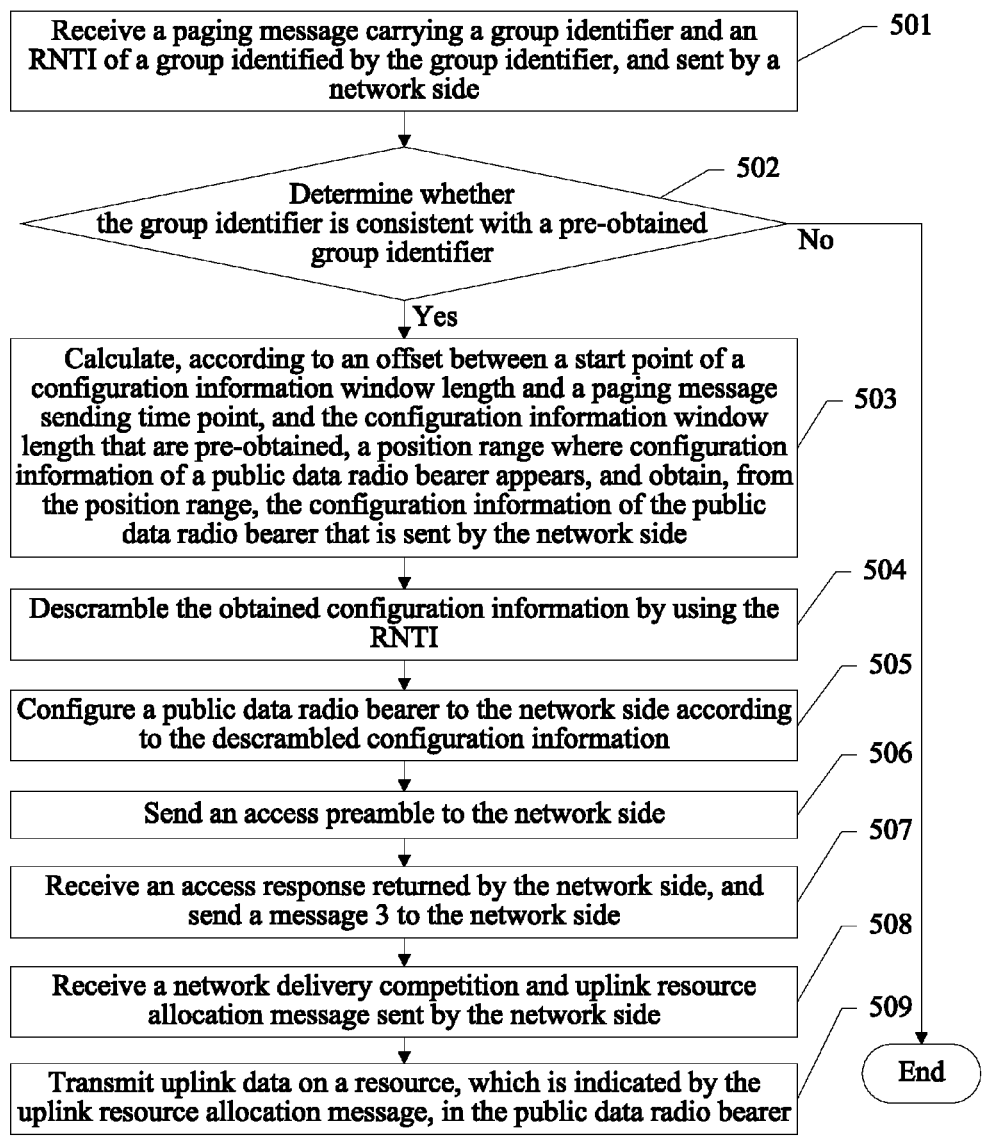
FIG. 7 is a schematic flowchart of another embodiment of another data transmission method according to an embodiment of the present invention.

FIG. 7 is a schematic flowchart of another embodiment of another data transmission method according to an embodiment of the present invention, and as shown in FIG. 7, the method includes:

501: Receive a paging message carrying a group identifier and an RNTI and sent by a network side.

502: Determine whether the group identifier is consistent with a pre-obtained group identifier, and if yes, perform step 503, that is, calculate, according to an offset between a start point of a configuration information window length and a paging occasion, and the configuration information window length that are pre-obtained, a position range where configuration information of a public data radio bearer appears, and obtain, from the position range, the configuration information of the public data radio bearer that is sent by the network side.

503: Calculate, according to the offset between the start point of the configuration information window length and the paging occasion, and the configuration information window length that are pre-obtained, the position range where the configuration information of the public data radio bearer appears, and obtain, from the position range, the configuration information of the public data radio bearer that is sent by the network side.

504: Descramble the obtained configuration information by using the RNTI.

505: Configure a public data radio bearer to the network side according to the descrambled configuration information.

506: Send an access preamble to the network side.

507: Receive an access response returned by the network side, and send a message 3 to the network side, where the message 3 includes the group identifier and a system architecture evolution temporary mobile station identifier S-TMSI, or the message 3 includes the group identifier and a random number.

As an optional implementation manner, when uplink data that needs to be uploaded is larger than a default data volume of the network side that is pre-obtained, the message 3 sent to the network side in step 507 may further include a BSR. The BSR is used to indicate an uplink data volume that needs to be uploaded.

In this implementation manner, after receiving the message 3, the network side modifies a data transmission bearer of a core network according to the BSR in the message 3.

It should be noted that, the network side modifies the data transmission bearer of the core network only when receiving a first message 3 sent by terminals in the same group. For details, refer to the third method embodiment of the present invention.

508: Receive a network delivery competition and uplink resource allocation message sent by the network side.

The network delivery competition and uplink resource allocation message is used to indicate a resource for uplink data transmission, and the network delivery competition and uplink resource allocation message is disclosed knowledge and is not described in detail herein.

509: Transmit uplink data on a resource, which is indicated by the uplink resource allocation message, in the configured public data radio bearer.

In the foregoing technical solution, based on the above embodiment, it is added that the access preamble is sent to the network side, the access response returned by the network side is received, the message 3 is sent to the network side, the network delivery competition and uplink resource allocation message sent by the network side is received, and the uplink data is transmitted on the resource, which is indicated by the uplink resource allocation message, in the configured public data radio bearer. Compared with the prior art, in this embodiment, RRC connection release and RRC connection reconfiguration are not required, and the uplink resource allocation message is obtained in RRC connection establishment, so that in the uplink data transmission process, the uplink data is transmitted by using a resource indicated by the network side, which can effectively save the network resources and can further improve the air interface transmission efficiency of a communication network.

Figure 8:
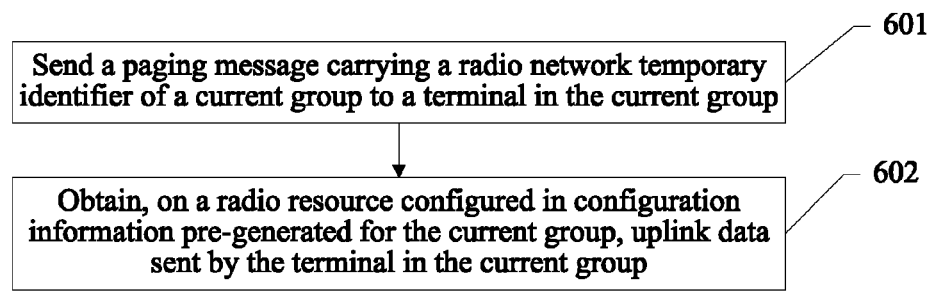
FIG. 8 is a schematic flowchart of another data transmission method according to an embodiment of the present invention.

FIG. 8 is a schematic flowchart of an embodiment of another data transmission method according to an embodiment of the present invention, and as shown in FIG. 8, the method includes:

601: Send a paging message carrying a group RNTI of a current group to a terminal in the current group.

It should be noted that, all terminals are grouped in advance, and each group after the grouping is configured with a different group RNTI.

602: Obtain, on a radio resource configured in configuration information pre-generated for the current group, uplink data sent by the terminal in the current group.

It should be noted that, in step 601, terminals with the same service type are grouped into one group according to different service types of terminals and configuration information is generated for each group, and at the same time, a group RNTI is generated for each group. That is to say, different configuration information and group RNTIs are generated for terminals with different service types, each piece of configuration information corresponds to terminals with the same service type, and each group RNTI corresponds to terminals with the same service type. The configuration information is periodically broadcast. After receiving the configuration information, the terminal stores, according to a service type of the terminal, configuration information corresponding to the service type. The configuration information includes: radio resource configuration and a group RNTI, where the radio resource configuration includes: general radio resource configuration (Radio Resource Config Common), and the Radio Resource Config Common may include: data radio bearer configuration (DRB Config), media access control layer-main configuration (mac-Main Config), physical layer configuration (Physical Config), and scheduling configuration (scheduleConfig). Optionally, the Radio Resource Config Common may further include: measurement configuration (meas Config) and/or mobility control information (Mobility ControlInfo) and/or handover security configuration (Security ConfigHO).

After receiving the paging message, the terminal obtains the group RNTI, and when a group identified by the group RNTI is a group where the terminal is located, that is, when the group RNTI matches a group RNTI pre-obtained by the terminal, a radio resource is configured through the pre-obtained configuration information, and the uplink data is transmitted through the configured radio resource.

As an optional implementation manner, step 601 may include send a paging message carrying the group RNTI of the current group and an index number of the configuration information to the terminal in the current group.

After obtaining the index number of the configuration information, the terminal may obtain, according to the index number, the configuration information corresponding to the index number.

In this implementation manner, step 602 may include obtaining, on a radio resource configured in the configuration information corresponding to the index number, the uplink data sent by the terminal in the current group.

In the foregoing technical solution, the paging message carrying the group RNTI of the current group is sent to the terminal in the current group, and the uplink data sent by the terminal in the current group is obtained on the radio resource configured in the configuration information pre-generated for the current group; in this way, in the uplink data transmission process, RRC connection establishment, security mode establishment, and RRC connection release are not required, thereby improving the air interface transmission efficiency of a communication network.

Figure 9:
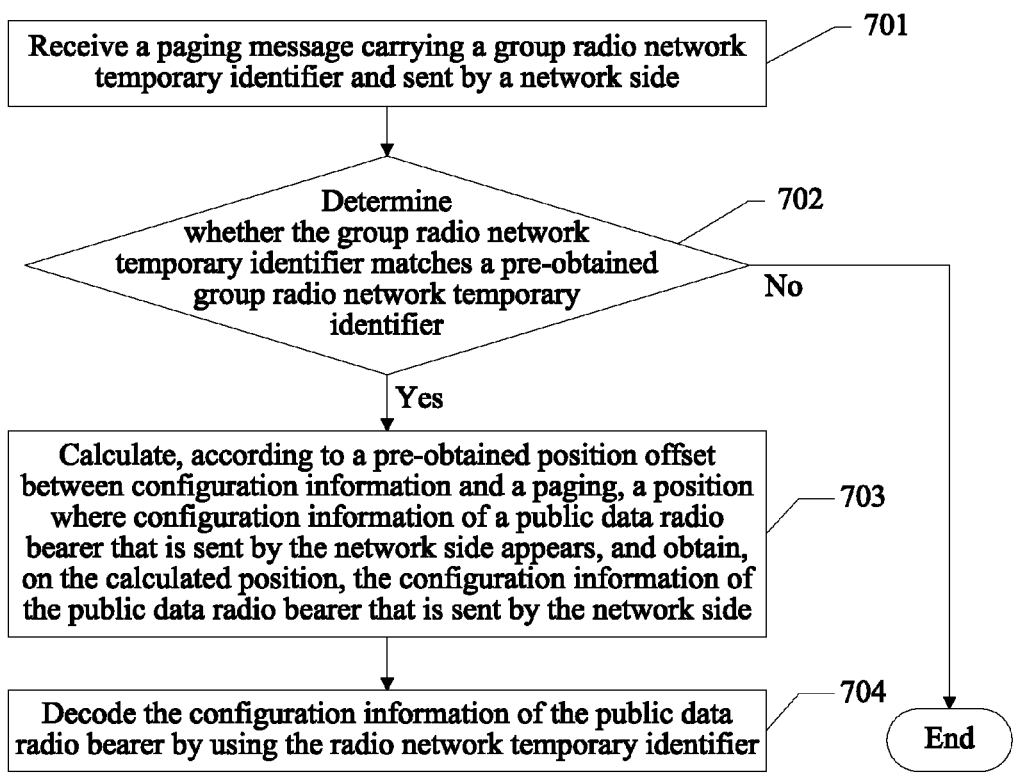
FIG. 9 is a schematic flowchart of another data transmission method according to an embodiment of the present invention.

FIG. 9 is a schematic flowchart of another embodiment of another data transmission method according to an embodiment of the present invention.

701: Receive a paging message carrying a group RNTI and sent by a network side.

702: Determine whether the group RNTI matches a pre-obtained group RNTI, and if yes, configure a radio resource according to pre-obtained configuration information.

As an optional implementation manner, the configuration information and the group RNTI are obtained before step 701, and the configuration information and the group RNTI may be specifically obtained through a broadcast message. The obtained configuration information and group RNTI are configuration information and a group RNTI that are corresponding to a service type thereof.

As an optional implementation manner, the network side groups terminals with the same service type into one group according to different service types of the terminals, generates configuration information for each group, and generates a group RNTI for each group. That is to say, different configuration information and group RNTIs are generated for terminals with different service types, each piece of configuration information corresponds to terminals with the same service type, and each group RNTI corresponds to terminals with the same service type. The network side then periodically broadcasts the configuration information. Before step 701, the corresponding configuration information and group RNTI can be obtained according to the service type thereof.

It should be noted that, the configuration information includes: radio resource configuration and the group RNTI, where the radio resource configuration includes: Radio Resource Config Common, and the Radio Resource Config Common may include: DRB Config, mac-Main Config, Physical Config, and scheduleConfig. Optionally, the Radio Resource Config Common may further include: meas Config and/or Mobility ControlInfo and/or Security ConfigHO.

703: Configure the radio resource according to the pre-obtained configuration information.

The configuration process is disclosed knowledge and is not described in detail herein.

704: Transmit uplink data through the configured radio resource.

As an optional implementation manner, after step 703, the method may further include releasing the radio resource.

In this way, the radio resource is released after the uplink data is transmitted, so as to save the network resources; however, after the radio resource is released, the configuration information is continually stored for transmitting uplink data next time.

As an optional implementation manner, step 701 may include receiving a paging message carrying the group RNTI and an index number of the configuration information and sent by the network side.

In this implementation manner, step 703 may include obtaining the configuration information corresponding to the index number; and configuring the radio resource according to the pre-obtained configuration information.

In the foregoing technical solution, the paging message carrying the group RNTI and sent by the network side is received, whether the group RNTI matches the pre-obtained group RNTI is determined, and if yes, the radio resource is configured according to the pre-obtained configuration information. The uplink data is transmitted through the configured radio resource. In this way, in the uplink data transmission process, RRC connection establishment, security mode establishment, and RRC connection release are not required, thereby improving the air interface transmission efficiency of a communication network.

Figure 10:
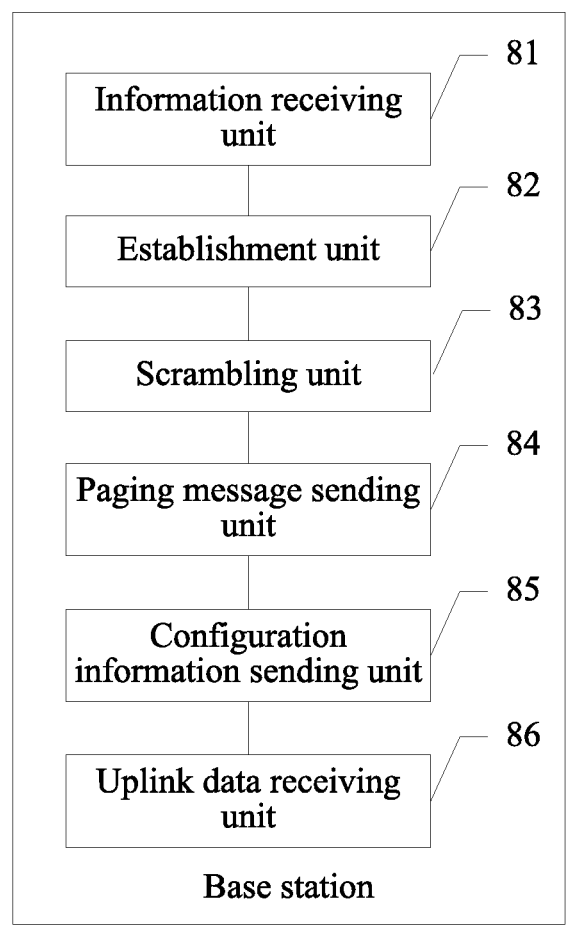
FIG. 10 is a schematic structural diagram of an embodiment of a base station according to an embodiment of the present invention.

FIG. 10 is a schematic structural diagram of an embodiment of a base station according to an embodiment of the present invention, and as shown in FIG. 10, the base station includes: an information receiving unit 81, an establishment unit 82, a scrambling unit 83, a paging message sending unit 84, a configuration information sending unit 85, and an uplink data receiving unit 86.

The information receiving unit 81 is adapted to receive a group identifier, a configuration information window length, and an offset between a start point of the configuration information window length and a paging occasion that are sent by an MME.

It can be understood that, when a terminal in a group is required to transmit uplink data, the terminal receives a group identifier of the group, a configuration information window length, and an offset between a start point of the configuration information window length and a paging occasion that are sent by the MME. A group identifier is a fixed identifier of each terminal group, and specifically, terminals are grouped in advance, and each group has a fixed group identifier.

The establishment unit 82 is adapted to establish a public data radio bearer to a terminal corresponding to the group identifier.

The scrambling unit 83 is adapted to scramble configuration information of the public data radio bearer by using an RNTI.

The paging message sending unit 84 is adapted to send a paging message carrying the group identifier and the RNTI to the terminal.

As an optional implementation manner, the paging message carrying the group identifier and the RNTI and sent to the terminal is specifically sent to the terminal through a paging channel.

The configuration information sending unit 85 is adapted to send the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer.

As an optional implementation manner, the configuration information of the public data radio bearer that is sent to the terminal in the configuration information window length may be specifically sent to the terminal through a physical downlink control channel.

As an optional implementation manner, the paging message sent by the paging message sending unit 84 and the configuration information sent by the configuration information sending unit 85 may be specifically shown in FIG. 2, the configuration information window length and the offset between the start point of the configuration information window length and the paging occasion are sent by the MME, and a paging cycle is preconfigured. In this way, after receiving the paging message, the terminal may calculate, according to the offset between the start point of the configuration information window length and the paging occasion, and the configuration information window length that are pre-obtained by the terminal, the position range where the configuration information appears.

The calculated position is specifically a time period, that is, a time period when the configuration information window length appears. Definitely, a position where the configuration information appears in the configuration information window length may not be fixed, and as shown in FIG. 2, the configuration information may appear in a first unit or appear in a second unit in the configuration information window length, that is, the terminal may obtain the configuration information through multiple times of acquisition. Specifically, the configuration information sent to the terminal may be further sent to the terminal in the configuration information window length for multiple times, and as shown in FIG. 2, the configuration information may be sent to the terminal from the first unit in the configuration information window length, then, the configuration information may be further sent to the terminal from the second unit in the configuration information window length, and after that, the configuration information may be further sent to the terminal from a third unit in the configuration information window length until the configuration information window length ends.

As an optional implementation manner, the configuration information sending unit 85 may be further adapted to send the configuration information of the public data radio bearer to the terminal in the configuration information window length for at least once.

Optionally, as shown in FIG. 2, the configuration information may be sent to the terminal from the first unit in the configuration information window length, then, the configuration information may be further sent to the terminal from the second unit in the configuration information window length, and after that, the configuration information may be further sent to the terminal from a third unit in the configuration information window length until the configuration information window length ends.

Optionally, after receiving the paging message, the terminal calculates, through the offset between the start point of the configuration information window length and the paging occasion, and the configuration information window length that are pre-obtained by the terminal, the position range where the configuration information of the public data radio bearer appears, obtains the configuration information from the calculated position range, and transmits the uplink data on the public data radio bearer according to the configuration information. The calculated position is specifically a time value, and the terminal may obtain, according to the time value, the configuration information, on a bearer transmitting the configuration information, and transmit the uplink data on the public data radio bearer.

Optionally, after receiving the paging message, the terminal obtains the group identifier and the RNTI, determines whether the group identifier matches a group identifier obtained and stored by the terminal, if yes, calculates, through the offset between the start point of the configuration information window length and the paging occasion, and the configuration information window length that are pre-obtained by the terminal, the position range where the configuration information of the public data radio bearer appears, obtains the configuration information from the calculated position range, descrambles the configuration information by using the obtained RNTI, knows a configuration of the public data radio bearer according to the descrambled configuration information, and transmits the uplink data on the public data radio bearer.

The uplink data receiving unit 86 is adapted to receive the uplink data transmitted by the terminal on the public data radio bearer.

In the foregoing technical solution, the information receiving unit receives the group identifier, the configuration information window length, and the offset between the start point of the configuration information window length and the paging occasion that are sent by the MME, the establishment unit establishes the public data radio bearer to the terminal corresponding to the group identifier, the scrambling unit scrambles the configuration information of the public data radio bearer by using the RNTI, the paging message sending unit sends the paging message carrying the group identifier and the RNTI to a terminal in a paged group, and the paging message sending unit sends the configuration information of the public data radio bearer to the terminal in the configuration information window length. In this way, when receiving the paging message, the terminal can obtain the configuration information, and then transmit the uplink data on the public data radio bearer according to the configuration information, so that in the uplink data transmission process, radio resource control protocol (Radio Resource Control, RRC) connection establishment, security mode establishment, and RRC connection release are not required, thereby improving the air interface transmission efficiency of a communication network.

Figure 11:
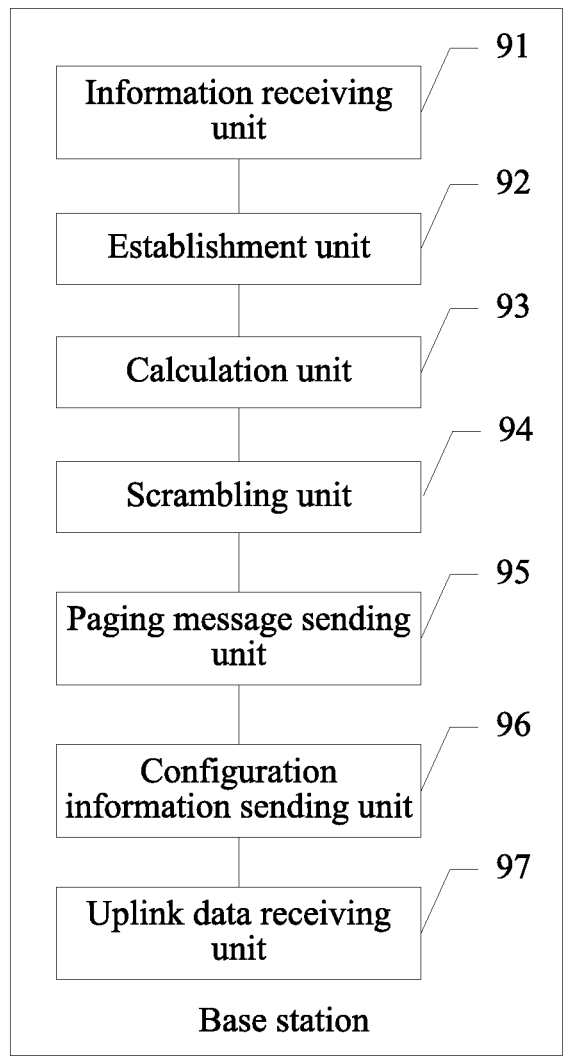
FIG. 11 is a schematic structural diagram of another embodiment of a base station according to an embodiment of the present invention.

FIG. 11 is a schematic structural diagram of another embodiment of a base station according to an embodiment of the present invention, and as shown in FIG. 11, the base station includes: an information receiving unit 91, an establishment unit 92, a calculation unit 93, a scrambling unit 94, a paging message sending unit 95, a configuration information sending unit 96, and an uplink data receiving unit 97.

The information receiving unit 91 is adapted to receive a radio bearer life cycle, a group identifier, a configuration information window length, and an offset between a start point of the configuration information window length and a paging occasion that are sent by an MME.

The establishment unit 92 is adapted to establish a public data radio bearer having the radio bearer life cycle to a terminal corresponding to the group identifier.

The calculation unit 93 is adapted to calculate a life cycle count value of the public data radio bearer.

The calculation unit 93 may specifically calculate the life cycle count value of the public data radio bearer through the following formula:

$$DRB\text{LifeTimeCounter} = \text{floor}(DRB\text{LifeTime}/\text{PagingCycle}) + 1,$$

where the DRB LifeTime Counter is the life cycle count value, the floor represents rounding down, the DRB Life Time is a life cycle of the public data radio bearer, the Paging Cycle is a paging cycle and the paging cycle is preconfigured, and the Paging Cycle may be specifically shown in the following formula:

PagingCycle=min(*UE* Specific *DRX*,default *DRX*), where the min is a minimum value, the UE Specific DRX is a UE specific discontinuous reception period, and the Default DRX is a default discontinuous reception period.

The scrambling unit 94 is adapted to scramble configuration information of the public data radio bearer by using an RNTI.

The paging message sending unit 95 is adapted to send a paging message carrying the group identifier and the RNTI to the terminal for a number of times that is smaller than or equal to the life cycle count value.

Optionally, the paging message and the configuration information of the public data radio bearer are sent to the terminal for multiple times; in this way, it can be effectively ensured that it is more likely for the terminal to receive the paging message and the configuration information of the public data radio bearer.

The configuration information sending unit 96 is adapted to send the scrambled configuration information of the public data radio bearer that carries the life cycle count value to the terminal in the configuration information window length, where the life cycle count value is a life cycle count value decreased by 1 after the paging message is sent each time, so that after receiving the paging message, the terminal calculates, according to the offset between the start point of the configuration information window length and the paging occasion, and the configuration information window length that are pre-obtained by the terminal, a position range where the configuration information of the public data radio bearer appears, obtains the configuration information from the position range, and transmits uplink data on the public data radio bearer according to the configuration information.

Optionally, when the paging message sending unit 94 sends the paging message to the terminal for multiple times, and the offset between the start point of the configuration information window length and the paging occasion is unchanged, each time the paging message sending unit 95 sends the paging message, a corresponding configuration information window length exists, and the configuration information sending unit 96 sends the configuration information of the public data radio bearer that carries the life cycle count value of the public data radio bearer to the terminal in multiple configuration information window lengths. That is to say, the configuration information sending unit 96 sends the configuration information of the public data radio bearer that carries the life cycle count value of the public data radio bearer to the terminal in the multiple configuration information window lengths.

As an optional implementation manner, the configuration information sending unit 96 may be further adapted to send the configuration information of the public data radio bearer that carries the life cycle count value of the public data radio bearer to the terminal in the configuration information window length for at least once.

Optionally, details are shown in FIG. 4, and the configuration information of the public data radio bearer is sent in the configuration information window length in FIG. 4 for at least once.

In this way, the configuration information of the public data radio bearer is sent in the configuration information window length for at least once, and the terminal may have more chances to obtain the configuration information of the public data radio bearer.

The uplink data receiving unit 97 is adapted to receive the uplink data transmitted by the terminal on the public data radio bearer.

In the foregoing technical solution, based on the above embodiment, the cycle of the established public data radio bearer is limited; in this way, the network resources can be saved, and at the same time, the paging message and the configuration information are sent to the terminal for multiple times in the life cycle of the public data radio bearer, which can ensure that it is most likely for the terminal to receive the paging message and the configuration information, and the resource utilization rate is high. The air interface transmission efficiency of a communication network is further improved.

Figure 12:
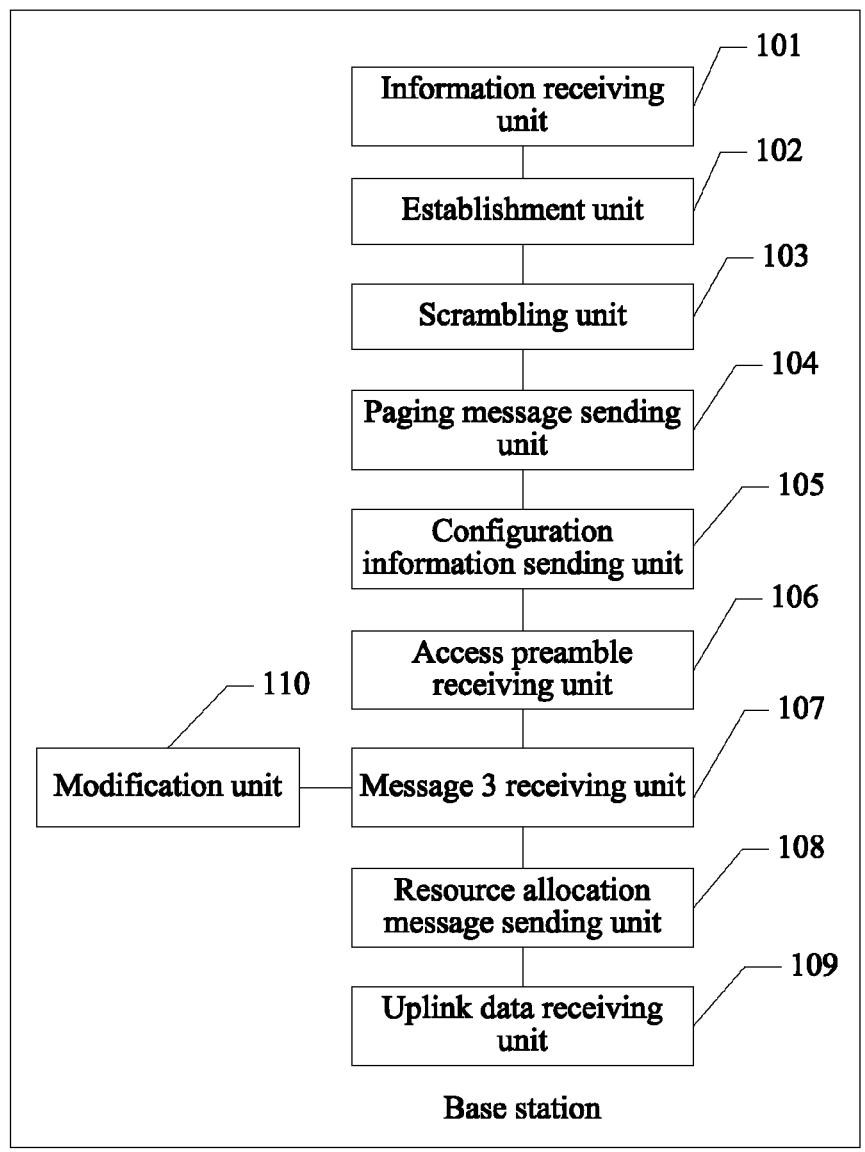
FIG. 12 is a schematic structural diagram of another embodiment of a base station according to an embodiment of the present invention.

FIG. 12 is a schematic structural diagram of another embodiment of a base station according to an embodiment of the present invention, and as shown in FIG. 12, the base station includes: an information receiving unit 101, an establishment unit 102, a scrambling unit 103, a paging message sending unit 104, a configuration information sending unit 105, an access preamble receiving unit 106, a message 3 receiving unit 107, a resource allocation message sending unit 108, and an uplink data receiving unit 109.

The information receiving unit 101 is adapted to receive an offset between a start point of a configuration information window length and a paging occasion, a group identifier, and the configuration information window length that are sent by an MME.

The establishment unit 102 is adapted to establish a public data radio bearer to a terminal corresponding to the group identifier.

The scrambling unit 103 scrambles configuration information of the public data radio bearer by using an RNTI.

The paging message sending unit 104 is adapted to send a paging message carrying the group identifier and the RNTI to the terminal.

The configuration information sending unit 105 is adapted to send the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer.

The access preamble receiving unit 106 is adapted to receive an access preamble sent by the terminal, and return an access response to the terminal.

The message 3 receiving unit 107 is adapted to receive a message 3 sent by the terminal, where the message 3 includes the group identifier and a system architecture evolution temporary mobile station identifier S-TMSI, or the message 3 includes the group identifier and a random number.

After the message 3 is received, which terminals in a group that receive the paging message and the configuration information are known.

The resource allocation message sending unit 108 is adapted to send a network delivery competition and uplink resource allocation message to the terminal, so that the terminal transmits the uplink data on a resource, which is indicated by the uplink resource allocation message, in the public data radio bearer.

Optionally, after receiving the paging message, the terminal obtains the group identifier and the RNTI, determines whether the group identifier matches a group identifier obtained and stored by the terminal, if yes, calculates, through the offset between the start point of the configuration information window length and the paging occasion, and the configuration information window length that are pre-obtained by the terminal, the position range where the configuration information of the public data radio bearer appears, obtains the configuration information from the calculated position range, descrambles the configuration information by using the obtained RNTI, knows a configuration of the public data radio bearer according to the descrambled configuration information, and when receiving the delivery competition and uplink resource allocation message, may transmit the uplink data on the resource, which is indicated by the uplink resource allocation message, in the public data radio bearer.

The uplink data receiving unit 109 is adapted to receive the uplink data transmitted by the terminal on the public data radio bearer.

As an optional implementation manner, when uplink data that needs to be uploaded by the terminal is larger than a default data volume of the network side that is pre-obtained by the terminal, the message 3 further includes a BSR, where the BSR is used to indicate an uplink data volume that needs to be uploaded by the terminal.

Specifically, information of the default data volume of the network side is prestored in an HSS, and each time the terminal needs to transmit the uplink data, the MME sends the information of the default data volume of the network side to the terminal in advance.

In this implementation manner, the base station may further include a modification unit 1010, adapted to when a first message 3 sent by the terminal is received, modify a data transmission bearer of a core network.

It can be understood that, the data transmission bearer of the core network is modified only according to a BSR in the received first message 3, and when another message 3 is received, the data transmission bearer of the core network is not modified. Therefore, uplink data that needs to be transmitted by terminals in the same group is the same.

The modified data transmission bearer of the core network satisfies the condition that the uplink data transmitted by the terminal is transmitted in the core network.

In the foregoing technical solution, based on the above embodiment, it is added that the access preamble receiving unit receives the access preamble sent by the terminal and returns the access response to the terminal, the message 3 receiving unit receives the message 3 sent by the terminal, and the resource allocation message sending unit sends the network delivery competition and uplink resource allocation message to the terminal, so as to indicate a resource used by each terminal receiving the paging message and the configuration information to transmit the uplink data on the public data radio bearer. Compared with the prior art, in this embodiment, RRC connection release and RRC connection reconfiguration are not required, and in RRC connection establishment, a resource used by the terminal to transmit the uplink data on the public data radio bearer is indicated; in this way, a resource of the public data radio bearer is reasonably allocated, and the air interface transmission efficiency of a communication network is improved.

Figure 13:
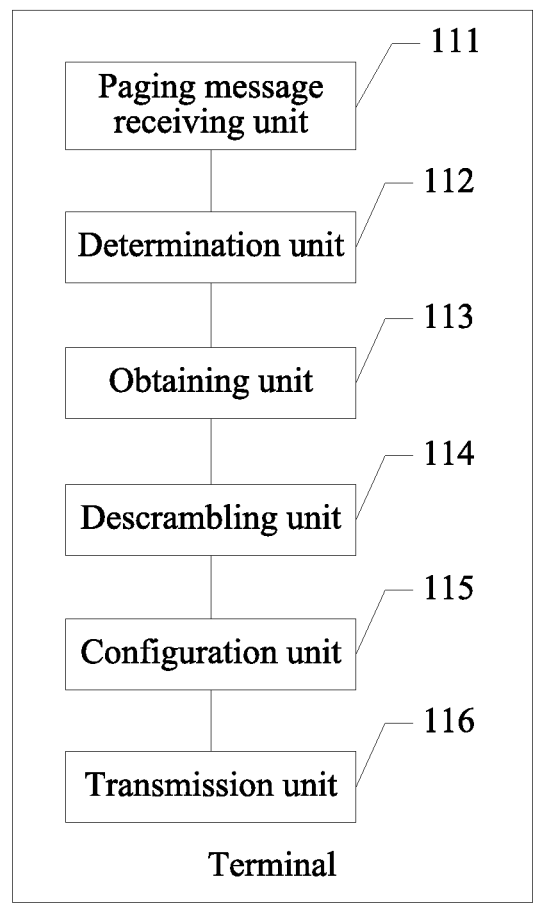
FIG. 13 is a schematic structural diagram of an embodiment of a terminal according to an embodiment of the present invention.

FIG. 13 is a schematic structural diagram of an embodiment of a terminal according to an embodiment of the present invention, and as shown in FIG. 13, the terminal includes: a paging message receiving unit 111, a determination unit 112, an obtaining unit 113, a descrambling unit 114, a configuration unit 115, and a transmission unit 116.

The paging message receiving unit 111 is adapted to receive a paging message carrying a group identifier and an RNTI and sent by a network side.

The determination unit 112 is adapted to determine whether the group identifier is consistent with a pre-obtained group identifier.

The obtaining unit 113 is adapted to: when the determination unit 112 determines that the group identifier is consistent with the pre-obtained group identifier, calculate, according to an offset between a start point of a configuration information window length and a paging occasion, and the configuration information window length that are pre-obtained, a position range where configuration information of a public data radio bearer appears, and obtain, from the position range, the configuration information of the public data radio bearer that is sent by the network side.

As an optional implementation manner, the group identifier, the configuration information window length, and the offset between the start point of the configuration information window length and the paging occasion may be obtained through an initial attachment Attach procedure. The Attach procedure belongs to disclosed knowledge and is not described in detail herein.

As an optional implementation manner, the position range where the configuration information of the public data radio bearer appears may be specifically shown in FIG. 2 or FIG. 4.

As an optional implementation manner, the position range where the configuration information of the public data radio bearer appears and that is calculated by the obtaining unit 113 may specifically be a position of the configuration information window length, and the network side may send the configuration information of the public data radio bearer on the position of the configuration information window length for multiple times, so that after the obtaining unit 113 calculates the position range where the configuration information of the public data radio bearer appears, multiple times of acquisition may be performed on the position until the configuration information of the public data radio bearer is obtained.

As an optional implementation manner, the configuration information of the public data radio bearer that is obtained by the obtaining unit 113 carries a life cycle count value of the public data radio bearer.

In this way, after the configuration information of the public data radio bearer is obtained, a life cycle of the public data radio bearer that is indicated by the configuration information of the public data radio bearer can be known, so that uplink data transmission is completed in the life cycle as soon as possible.

The descrambling unit 114 is adapted to descramble the obtained configuration information by using the RNTI.

The configuration unit 115 is adapted to configure a public data radio bearer to the network side according to the descrambled configuration information.

The transmission unit 116 is adapted to transmit uplink data on the configured public data radio bearer.

As an optional implementation manner, the terminal includes, but is not limited to, an MTC terminal.

In the foregoing technical solution, the obtaining unit obtains the paging message and the configuration information of the public data radio bearer that are sent by the network side, after the descrambling unit descrambles the obtained configuration information, a configuration of the public data radio bearer established by the network side can be known, the configuration unit configures the public data radio bearer to the network side by using the descrambled configuration information, and the transmission unit can transmit the uplink data on the public data radio bearer. In this way, in the uplink data transmission process, RRC connection establishment, security mode establishment, and RRC connection release are not required, thereby improving the air interface transmission efficiency of a communication network.

Figure 14:
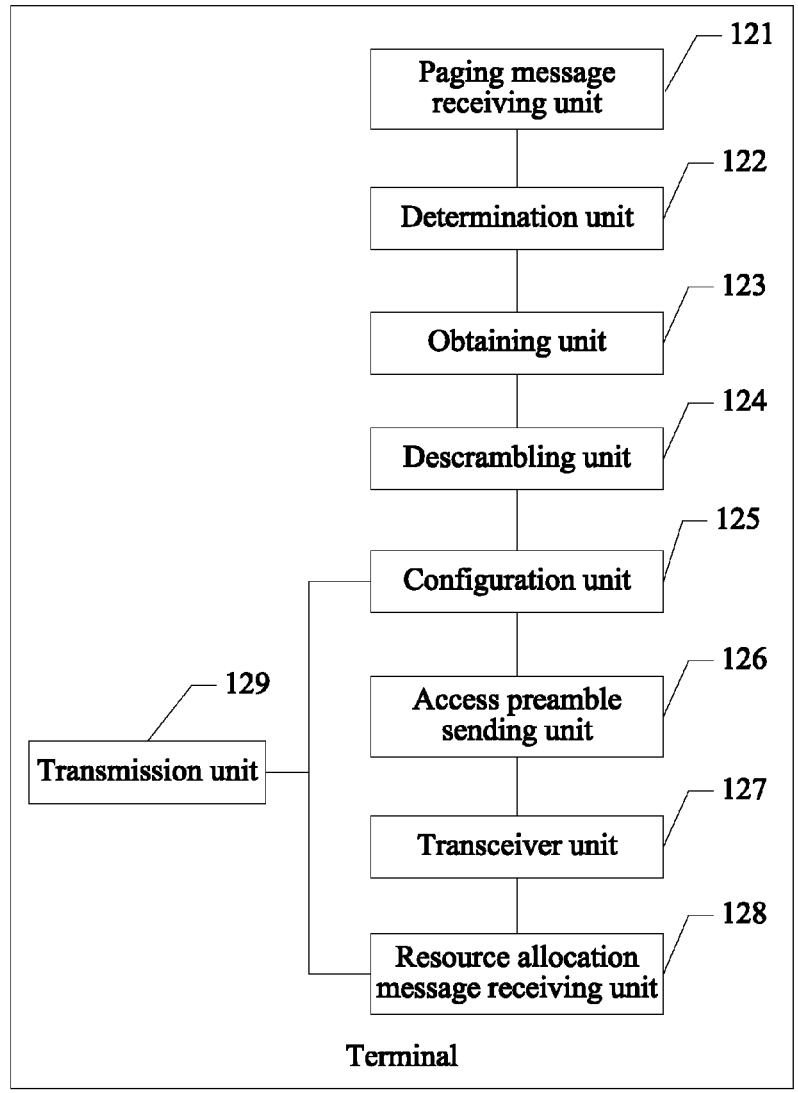
FIG. 14 is a schematic structural diagram of another embodiment of a terminal according to an embodiment of the present invention.

FIG. 14 is a schematic structural diagram of another embodiment of a terminal according to an embodiment of the present invention, and as shown in FIG. 14, the terminal includes: a paging message receiving unit 121, a determination unit 122, an obtaining unit 123, a descrambling unit 124, a configuration unit 125, an access preamble sending unit 126, a transceiver unit 127, a resource allocation message receiving unit 128, and a transmission unit 129.

The paging message receiving unit 121 is adapted to receive a paging message carrying a group identifier and an RNTI and sent by a network side.

The determination unit 122 is adapted to determine whether the group identifier is consistent with a pre-obtained group identifier.

As an optional implementation manner, the group identifier, and the offset between the start point of the configuration information window length and the paging occasion may be obtained through an initial attachment Attach procedure. The Attach procedure belongs to disclosed knowledge and is not described in detail herein.

The obtaining unit 123 is adapted to, when the determination unit 122 determines that the group identifier is consistent with the pre-obtained group identifier, calculate, according to an offset between a start point of a configuration information window length and a paging occasion, and the configuration information window length that are pre-obtained, a position range where configuration information of a public data radio bearer appears, and obtain, from the position range, the configuration information of the public data radio bearer that is sent by the network side.

The descrambling unit 124 is adapted to descramble, by using the RNTI, the configuration information obtained by the obtaining unit.

The configuration unit 125 is adapted to configure a public data radio bearer to the network side according to the descrambled configuration information.

The access preamble sending unit 126 is adapted to send an access preamble to the network side.

The transceiver unit 127 is adapted to receive an access response returned by the network side, and send a message 3 to the network side, where the message 3 includes the group identifier and a system architecture evolution temporary mobile station identifier S-TMSI, or the message 3 includes the group identifier and a random number.

As an optional implementation manner, when uplink data that needs to be uploaded is larger than a default data volume of the network side that is pre-obtained, the message 3 sent by the transceiver unit 127 to the network side further includes a BSR. The BSR is used to indicate an uplink data volume that needs to be uploaded.

In this implementation manner, after receiving the message 3, the network side modifies a data transmission bearer of a core network according to the BSR in the message 3.

It should be noted that, the network side modifies the data transmission bearer of the core network only when receiving a first message 3 sent by terminals in the same group.

The resource allocation message receiving unit 128 is adapted to receive a network delivery competition and uplink resource allocation message sent by the network side.

The network delivery competition and uplink resource allocation message is used to indicate a resource for uplink data transmission, and the network delivery competition and uplink resource allocation message is disclosed knowledge and is not described in detail herein.

The transmission unit 129 is adapted to transmit uplink data on a resource, which is indicated by the uplink resource allocation message, in the configured public data radio bearer.

In the foregoing technical solution, based on the above embodiment, it is added that the access preamble sending unit sends the access preamble to the network side, the transceiver unit receives the access response returned by the network side and sends the message 3 to the network side, the resource allocation message receiving unit receives the network delivery competition and uplink resource allocation message sent by the network side, and the transmission unit transmits the uplink data on the resource, which is indicated by the uplink resource allocation message, in the public data radio bearer configured by the configuration unit. Compared with the prior art, in this embodiment, RRC connection release and RRC connection reconfiguration are not required, and the uplink resource allocation message is obtained in RRC connection establishment, so that in the uplink data transmission process, the uplink data is transmitted by using a resource indicated by the network side, which can effectively save the network resources and can further improve the air interface transmission efficiency of a communication network.

Figure 15:
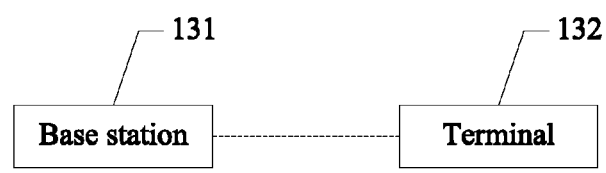
FIG. 15 is a schematic structural diagram of a data transmission system according to an embodiment of the present invention.

FIG. 15 is a schematic structural diagram of a data transmission system according to an embodiment of the present invention, and as shown in FIG. 15, the system includes: a base station 131 and a terminal 132.

As an optional implementation manner, the base station 131 may include the base station according to any implementation manner of the foregoing embodiments.

The base station 131 may include: an information receiving unit, an establishment unit, a scrambling unit, a paging message sending unit, a configuration information sending unit, and an uplink data receiving unit.

The information receiving unit is adapted to receive a group identifier, a configuration information window length, and an offset between a start point of the configuration information window length and a paging occasion that are sent by a mobility management entity.

The establishment unit is adapted to establish a public data radio bearer to a terminal corresponding to the group identifier.

The scrambling unit is adapted to scramble configuration information of the public data radio bearer by using an RNTI.

The paging message sending unit is adapted to send a paging message carrying the group identifier and the RNTI to the terminal.

The configuration information sending unit is adapted to send the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer.

The uplink data receiving unit is adapted to receive the uplink data transmitted by the terminal on the public data radio bearer.

As an optional implementation manner, the terminal 132 may include the terminal according to any implementation manner of the foregoing embodiments.

The terminal 132 may include a paging message receiving unit, a determination unit, an obtaining unit, a descrambling unit, a configuration unit, and a transmission unit.

The paging message receiving unit is adapted to receive a paging message carrying a group identifier and an RNTI and sent by a network side.

The determination unit is adapted to determine whether the group identifier is consistent with a pre-obtained group identifier.

The obtaining unit is adapted to: when the determination unit determines that the group identifier is consistent with the pre-obtained group identifier, calculate, according to an offset between a start point of a configuration information window length and a paging occasion, and the configuration information window length that are pre-obtained, a position range where configuration information of a public data radio bearer appears, and obtain, from the position range, the configuration information of the public data radio bearer that is sent by the network side.

The descrambling unit is adapted to descramble the obtained configuration information by using the RNTI.

The configuration unit is adapted to configure a public data radio bearer to the network side according to the descrambled configuration information.

The transmission unit is adapted to transmit uplink data on the configured public data radio bearer.

As an optional implementation manner, the terminal includes, but is not limited to, an MTC terminal.

In the foregoing technical solution, the base station sends the paging message carrying the group identifier and the RNTI, and the configuration information of the public data radio bearer to the terminal, and after obtaining the group identifier, the terminal determines whether the group identifier is consistent with the pre-obtained group identifier, if yes, obtains the configuration information, descrambles the configuration information by using the RNTI, and transmits the uplink data on the public data radio bearer indicated by the descrambled configuration information of the public data radio bearer. In this way, in the uplink data transmission process, RRC connection establishment, security mode establishment, and RRC connection release are not required, thereby improving the air interface transmission efficiency of a communication network.

Figure 16:
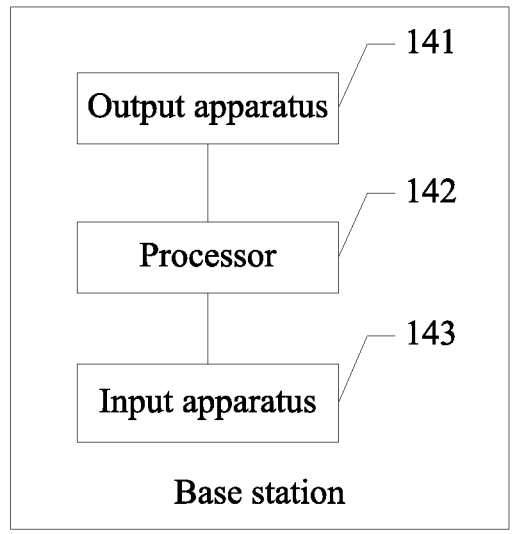
FIG. 16 is a schematic structural diagram of an embodiment of another base station according to an embodiment of the present invention.

FIG. 16 is a schematic structural diagram of another base station according to an embodiment of the present invention, and as shown in FIG. 16, the base station includes: an output apparatus 141, a processor 142, and an input apparatus 143.

The processor 142 is adapted to perform the following steps: receiving a group identifier, a configuration information window length, and an offset between a start point of the configuration information window length and a paging occasion that are sent by an MME; establishing a public data radio bearer to a terminal corresponding to the group identifier; scrambling configuration information of the public data radio bearer by using an RNTI; sending a paging message carrying the group identifier and the RNTI to the terminal; sending the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer; and receiving the uplink data transmitted by the terminal on the public data radio bearer.

As an optional implementation manner, the paging message carrying the group identifier and the RNTI and sent to the terminal is specifically sent to the terminal through a paging channel.

As an optional implementation manner, the configuration information of the public data radio bearer that is sent to the terminal in the configuration information window length may be specifically sent to the terminal through a physical downlink control channel.

Optionally, an offset exists between the start point of the configuration information window length and the sending of the paging message in step 104, that is, an offset exists between the start point of the configuration information window length and the paging occasion, and the offset is specifically a time value. It is assumed that, the time of sending the paging message in step 104 is 10:30:10, the offset is 3 S, and the configuration information window length is 5 S; in this way, it can be obtained that the start point of the configuration information window length is 10:30:13, and the configuration information window length is specifically 10:30:13-10:30:18, that is, in step 104, the configuration information of the public data radio bearer may be sent to the terminal in specifically this time period of 10:30:13-10:30:18.

As an optional implementation manner, the paging message and the configuration information that are sent by the processor 142 may be specifically shown in FIG. 2, and the offset between the start point of the configuration information window length and the paging occasion, and the configuration information window length are sent by the MME. A paging cycle is preconfigured. In this way, after receiving the paging message, the terminal may calculate, according to the offset between the start point of the configuration information window length and the paging occasion, and the configuration information window length that are pre-obtained by the terminal, the position range where the configuration information of the public data radio bearer appears. The calculated position is specifically a time period, that is, a time period when the configuration information window length appears. Definitely, a position where the configuration information of the public data radio bearer appears may not be fixed, and as shown in FIG. 2, the configuration information of the public data radio bearer may appear in a first unit or appear in a second unit in the configuration information window length, that is, the terminal may obtain the configuration information through multiple times of acquisition.

As an optional implementation manner, the sending the scrambled configuration information of the public data radio bearer to the terminal in the configuration information window length, which is performed by the processor 142, may specifically be sending the configuration information of the public data radio bearer to the terminal in the configuration information window length for at least once.

As shown in FIG. 2, the configuration information may be sent to the terminal from the first unit in the configuration information window length, then, the configuration information may be further sent to the terminal from the second unit in the configuration information window length, and after that, the configuration information may be further sent to the terminal from a third unit in the configuration information window length until the configuration information window length ends.

As an optional implementation manner, the terminal includes, but is not limited to, an MTC terminal.

As an optional implementation manner, the processor 142 may be further adapted to perform the following steps: receiving a radio bearer life cycle, a group identifier, a configuration information window length, and an offset between a start point of the configuration information window length and a paging occasion that are sent by an MME; establishing a public data radio bearer having the radio bearer life cycle to a terminal corresponding to the group identifier; calculating a life cycle count value of the public data radio bearer; scrambling configuration information of the public data radio bearer by using an RNTI; sending a paging message carrying the group identifier and the RNTI to the terminal; sending the scrambled configuration information of the public data radio bearer that carries the life cycle count value to the terminal in the configuration information window length, where the life cycle count value is a life cycle count value decreased by 1 after the paging message is sent each time, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer; and receiving the uplink data transmitted by the terminal on the public data radio bearer.

Optionally, the calculated life cycle count value of the public data radio bearer may be specifically calculated through the following formula:

$$DRB\text{LifeTimeCounter}=\text{floor}(DRB\text{LifeTime/PagingCycle})+1,$$

where the DRB Life Time Counter is the life cycle count value, the floor represents rounding down, the DRB Life Time is a life cycle of the public data radio bearer, the Paging Cycle is a paging cycle and the paging cycle is preconfigured, and the Paging Cycle may be specifically shown in the following formula:

$$\text{PagingCycle}=\min(UE \text{ Specific } DRX, \text{default } DRX),$$

where the min is a minimum value, the UE Specific DRX is a UE specific discontinuous reception period, and the Default DRX is a default discontinuous reception period.

It is assumed that, the radio bearer life cycle sent by the MME is 10 S, and the paging cycle is 3 S, so that the life cycle count value calculated through the foregoing calculation formula is 4.

Optionally, when the processor 142 sends the paging message to the terminal for multiple times, and the offset between the start point of the configuration information window length and the paging occasion is unchanged, each time the processor 142 sends the paging message, a corresponding configuration information window length exists, and the processor 142 sends the configuration information of the public data radio bearer that carries the life cycle count value of the public data radio bearer to the terminal in the configuration information window length. That is to say, the processor 142 sends the configuration information of the public data radio bearer that carries the life cycle count value of the public data radio bearer to the terminal in multiple configuration information window lengths.

Optionally, the step, which is performed by the processor 142, of sending the configuration information of the public data radio bearer that carries the life cycle count value of the public data radio bearer to the terminal in the configuration information window length may specifically be sending the scrambled configuration information of the public data radio bearer to the terminal in the configuration information window length for at least once.

Optionally, the scrambled configuration information of the public data radio bearer that carries the life cycle count value of the public data radio bearer may be specifically sent to the terminal in the configuration information window length for at least once.

Details are shown in FIG. 4, and the configuration information of the public data radio bearer is sent in the configuration information window length in FIG. 4 for at least once.

In this implementation manner, the cycle of the established public data radio bearer is limited; in this way, the network resources can be saved, and at the same time, the paging message and the configuration information are sent to the terminal for multiple times in the life cycle of the public data radio bearer, which can ensure that it is most likely for the terminal to receive the paging message and the configuration information, and the resource utilization rate is high. The air interface transmission efficiency of a communication network is further improved.

As an optional implementation manner, the processor 142 is further adapted to perform the following steps: receiving a group identifier, a configuration information window length, and an offset between a start point of the configuration information window length and a paging occasion that are sent by an MME; establishing a public data radio bearer to a terminal corresponding to the group identifier; scrambling configuration information of the public data radio bearer by using an RNTI; sending a paging message carrying the group identifier and the RNTI to the terminal; sending the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer; receiving an access preamble sent by the terminal, and returning an access response to the terminal; receiving a message 3 sent by the terminal, where the message 3 includes the group identifier and an S-TMSI, or the message 3 includes the group identifier and a random number; sending a network delivery competition and uplink resource allocation message to the terminal, so that the terminal transmits the uplink data on a resource, which is indicated by the uplink resource allocation message, in the public data radio bearer; and receiving the uplink data transmitted by the terminal on the resource, which is indicated by the uplink resource allocation message, in the public data radio bearer.

Optionally, when uplink data that needs to be uploaded by the terminal is larger than a default data volume of the network side, the message 3 further includes a BSR, where the BSR is used to indicate an uplink data volume that needs to be uploaded by the terminal.

After performing the step of receiving a message 3 sent by the terminal and before performing the step of sending a network delivery competition and uplink resource allocation message to the terminal, the processor 142 is further adapted to perform the following step, when a first message 3 sent by the terminal is received, modifying a data transmission bearer of a core network according to the message 3.

In this implementation manner, based on the above implementation manner, it is added that the access preamble sent by the terminal is received, the access response is returned to the terminal, the message 3 sent by the terminal is received, and the network delivery competition and uplink resource allocation message is sent to the terminal, so as to indicate a resource used by each terminal receiving the paging message and the configuration information to transmit the uplink data on the public data radio bearer. Compared with the prior art, in this embodiment, RRC connection release and RRC connection reconfiguration are not required, and in RRC connection establishment, a resource used by the terminal to transmit the uplink data on the public data radio bearer is indicated; in this way, a resource of the public data radio bearer is reasonably allocated, and the air interface transmission efficiency of a communication network is improved.

In the foregoing technical solution, the group identifier, the configuration information window length, and the offset between the start point of the configuration information window length and the paging occasion that are sent by the mobility management entity are received, the public data radio bearer to the terminal corresponding to the group identifier is established, the configuration information of the public data radio bearer is scrambled by using the RNTI, the paging message carrying the group identifier and the RNTI is sent to a terminal in a paged group, and the scrambled configuration information of the public data radio bearer is sent to the terminal in the configuration information window length. In this way, when receiving the paging message, the terminal can obtain the configuration information, and then transmit the uplink data on the public data radio bearer according to the configuration information, so that in the uplink data transmission process, RRC connection establishment, security mode establishment, and RRC connection release are not required, thereby improving the air interface transmission efficiency of a communication network.

Figure 17:
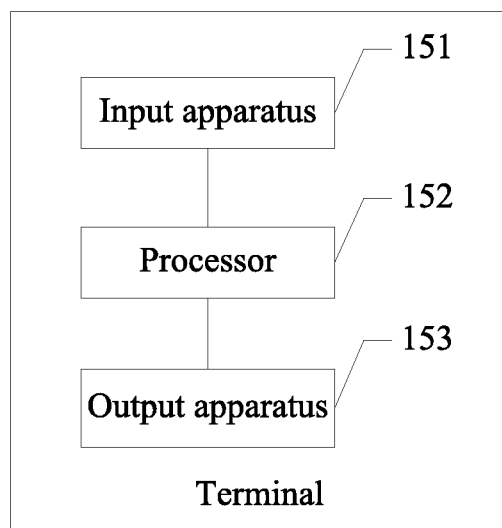
FIG. 17 is a schematic structural diagram of an embodiment of another terminal according to an embodiment of the present invention.

FIG. 17 is a schematic structural diagram of another terminal according to an embodiment of the present invention, and as shown in FIG. 17, the terminal includes: an input apparatus 151, a processor 152, and an output apparatus 153.

The processor 152 is adapted to perform the following steps: receiving a paging message carrying a group identifier and an RNTI and sent by a network side; determining whether the group identifier is consistent with a pre-obtained group identifier; if yes, calculating, according to an offset between a start point of a configuration information window length and a paging occasion, and the configuration information window length that are pre-obtained, a position range where configuration information of a public data radio bearer appears, and obtaining, from the position range, the configuration information of the public data radio bearer that is sent by the network side; descrambling the obtained configuration information by using the RNTI; configuring a public data radio bearer to the network side according to the descrambled configuration information; and transmitting uplink data on the configured public data radio bearer.

If not, end the procedure.

Figure 18:
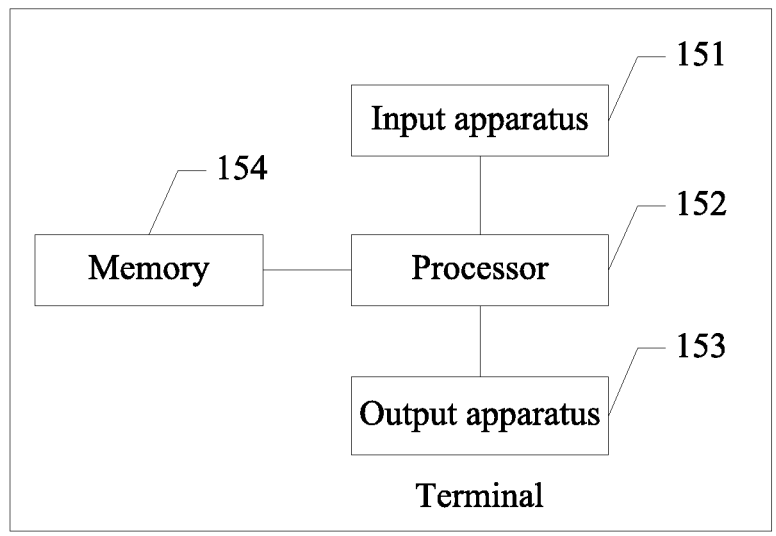
FIG. 18 is a schematic structural diagram of another embodiment of another terminal according to an embodiment of the present invention.

As an optional implementation manner, as shown in FIG. 18, the terminal may further include: a memory 154, adapted to store the pre-obtained offset between the start point of the configuration information window length and the paging occasion, and store a program performed by the processor 152.

As an optional implementation manner, the group identifier, and the offset between the start point of the configuration information window length and the paging occasion may be obtained through an initial attachment Attach procedure. The Attach procedure belongs to disclosed knowledge and is not described in detail herein.

As an optional implementation manner, the position range where the configuration information of the public data radio bearer appears may be specifically shown in FIG. 2 or FIG. 4.

As an optional implementation manner, the position range where the configuration information of the public data radio bearer appears and that is calculated by the processor 152 may specifically be a position of the configuration information window length, and the network side may send the configuration information of the public data radio bearer on the position of the configuration information window length for multiple times, so that after the processor 152 calculates the position range where the configuration information of the public data radio bearer appears, multiple times of acquisition may be performed on the position until the configuration information of the public data radio bearer is obtained.

As an optional implementation manner, the step, which is performed by the processor 152, of obtaining, on the calculated position, the configuration information of the public data radio bearer that is sent by the network side may specifically be obtaining, on the calculated position, the configuration information of the public data radio bearer that carries a life cycle count value of the public data radio bearer and is sent by the network side.

In this way, after the configuration information of the public data radio bearer is obtained, a life cycle of the public data radio bearer that is indicated by the configuration information of the public data radio bearer can be known, so that uplink data transmission is completed in the life cycle as soon as possible.

As an optional implementation manner, the processor 152 is further adapted to perform the following steps: receiving a paging message carrying a group identifier and an RNTI and sent by a network side; determining whether the group identifier is consistent with a pre-obtained group identifier; if yes, calculating, according to an offset between a start point of a configuration information window length and a paging occasion, and the configuration information window length that are pre-obtained, a position range where configuration information of a public data radio bearer appears, and obtaining, from the position range, the configuration information of the public data radio bearer that is sent by the network side; descrambling the obtained configuration information by using the RNTI; configuring a public data radio bearer to the network side according to the descrambled configuration information; sending an access preamble to the network side; receiving an access response returned by the network side, and sending a message 3 to the network side, where the message 3 includes the group identifier and a system architecture evolution temporary mobile station identifier S-TMSI, or the message 3 includes the group identifier and a random number; receiving a network delivery competition and uplink resource allocation message sent by the network side; and transmitting the uplink data on a resource, which is indicated by the uplink resource allocation message, in the configured public data radio bearer.

If not, end the procedure.

Optionally, when uplink data that needs to be uploaded is larger than a default data volume of the network side that is pre-obtained, the message 3 in the step, which is performed by the processor 152, of sending a message 3 to the network side may further include: a BSR. The BSR is used to indicate an uplink data volume that needs to be uploaded.

In this implementation manner, after receiving the message 3, the network side modifies a data transmission bearer of a core network according to the BSR in the message 3.

In the foregoing technical solution, the paging message and the configuration information of the public data radio bearer that are sent by the network side are obtained, and after the configuration information of the public data radio bearer is descrambled, the public data radio bearer to the network side is configured by using the descrambled configuration information, so as to transmit the uplink data on the public data radio bearer. In this way, in the uplink data transmission process, RRC connection establishment, security mode establishment, and RRC connection release are not required, thereby improving the air interface transmission efficiency of a communication network.

Figure 19:
FIG. 19 is a schematic structural diagram of another data transmission system according to an embodiment of the present invention.

FIG. 19 is a schematic structural diagram of another data transmission system according to an embodiment of the present invention, and as shown in FIG. 19, the system includes: a base station 161 and a terminal 162.

The base station 161 may include: an output apparatus, a processor, and an input apparatus.

The processor is adapted to perform the following steps: receiving a group identifier, a configuration information window length, and an offset between a start point of the configuration information window length and a paging occasion that are sent by a mobility management entity; establishing a public data radio bearer to a terminal corresponding to the group identifier; scrambling configuration information of the public data radio bearer by using an RNTI; sending a paging message carrying the group identifier and the RNTI to the terminal; sending the scrambled configuration information of the public data radio bearer to the terminal in the configuration information window length, so that after receiving the paging message, the terminal calculates, according to the configuration information window length and the offset that are pre-obtained by the terminal, a position range where the scrambled configuration information of the public data radio bearer appears, obtains the scrambled configuration information of the public data radio bearer from the position range, and transmits uplink data on the public data radio bearer; and receiving the uplink data transmitted by the terminal on the public data radio bearer.

The terminal 162 may include: an input apparatus, a processor, and an output apparatus.

The processor is adapted to perform the following steps: receiving a paging message carrying a group identifier and an RNTI and sent by a network side; determining whether the group identifier is consistent with a pre-obtained group identifier, if yes, calculating, according to an offset between a start point of a configuration information window length and a paging occasion, and the configuration information window length that are pre-obtained, a position range where configuration information of a public data radio bearer appears, and obtaining, from the position range, the configuration information of the public data radio bearer that is sent by the network side; descrambling the obtained configuration information by using the RNTI; configuring a public data radio bearer to the network side according to the descrambled configuration information; and transmitting uplink data on the configured public data radio bearer.

In the foregoing technical solution, the base station sends the paging message carrying the group identifier and the RNTI, and the configuration information of the public data radio bearer to the terminal, and after obtaining the group identifier, the terminal determines whether the group identifier is consistent with the pre-obtained group identifier, if yes, obtains the configuration information, descrambles the configuration information by using the RNTI, and transmits the uplink data on the public data radio bearer indicated by the descrambled configuration information of the public data radio bearer. In this way, in the uplink data transmission process, RRC connection establishment, security mode establishment, and RRC connection release are not required, thereby improving the air interface transmission efficiency of a communication network.

A person of ordinary skill in the art may understand that all or a part of the processes of the methods in the foregoing embodiments may be implemented by a computer program instructing relevant hardware. The program may be stored in a computer readable storage medium. When the program runs, the processes of the foregoing methods in the embodiments are performed. The storage medium may be a magnetic disk, an optical disk, a read-only memory (Read-Only Memory, ROM), or a random access memory (Random Access Memory, RAM).

The foregoing disclosed descriptions are merely exemplary embodiments of the present invention. However, the protection scope of the present invention is not limited thereto. Therefore, equivalent variations made according to the claims of the present invention shall fall within the protection scope of the present invention.

What is claimed is:

1. A data transmission method, comprising:
   receiving a group identifier, a configuration information window length, and an offset between a start point of the configuration information window length and a paging occasion that are sent by a mobility management entity;
   establishing a public data radio bearer to a terminal corresponding to the group identifier;
   scrambling configuration information of the public data radio bearer using a radio network temporary identifier;
   sending a paging message carrying the group identifier and the radio network temporary identifier to the terminal;
   sending the scrambled configuration information of the public data radio bearer to the terminal in the configuration information window length, so that after receiving the paging message, the terminal can calculate, according to the configuration information window length and the offset that are pre-obtained by the terminal, a position range where the scrambled configuration information of the public data radio bearer appears, obtain the scrambled configuration information of the public data radio bearer from the position range, and transmit uplink data on the public data radio bearer; and
   receiving the uplink data transmitted by the terminal on the public data radio bearer.

2. The method according to claim 1, wherein before establishing the public data radio bearer to a terminal corresponding to the group identifier, the method further comprises receiving a radio bearer life cycle sent by the mobility management entity; and wherein establishing the public data radio bearer to a terminal corresponding to the group identifier comprises establishing a public data radio bearer having the radio bearer life cycle to the terminal corresponding to the group identifier.

3. The method according to claim 2, wherein after establishing the public data radio bearer having the radio bearer life cycle to the terminal corresponding to the group identifier and before scrambling the configuration information of the public data radio bearer, the method further comprises calculating a life cycle count value of the public data radio bearer through the following formula:

$$DRB\text{LifeTimeCounter}=\text{floor}(DRB\text{LifeTime/Paging-Cycle})+1,$$

wherein the DRB Life Time Counter is the life cycle count value, the floor represents rounding down, the DRB Life Time is a life cycle of the public data radio bearer, the Paging Cycle is a paging cycle, and the paging cycle is preconfigured.

4. The method according to claim 3, wherein sending the paging message carrying the group identifier and the radio network temporary identifier to the terminal comprises sending the paging message carrying the group identifier and the radio network temporary identifier to the terminal for a number of times that is smaller than or equal to the life cycle count value.

5. The method according to claim 3, wherein sending the scrambled configuration information of the public data radio bearer to the terminal in the configuration information window length comprises sending the scrambled configuration information of the public data radio bearer that carries the life cycle count value to the terminal in the configuration information window length, wherein the life cycle count value is a life cycle count value decreased by one after the paging message is sent each time.

6. The method according to claim 2, wherein sending the scrambled configuration information of the public data radio bearer to the terminal in the configuration information window length comprises sending the scrambled configuration information of the public data radio bearer to the terminal in the configuration information window length for at least once.

7. The method according to claim 1, wherein after sending the scrambled configuration information of the public data radio bearer to the terminal in the configuration information window length and before receiving the uplink data transmitted by the terminal on the public data radio bearer, the method further comprises:
receiving an access preamble sent by the terminal, and returning an access response to the terminal;
receiving a message 3 sent by the terminal, wherein the message 3 comprises the group identifier and a system architecture evolution temporary mobile station identifier S-TMSI, or the message 3 comprises the group identifier and a random number; and
sending a network delivery competition and uplink resource allocation message to the terminal, so that the terminal transmits the uplink data on a resource, which is indicated by the uplink resource allocation message, in the public data radio bearer.

8. The method according to claim 7, wherein, when uplink data that needs to be uploaded by the terminal is larger than a default data volume of the network side that is pre-obtained by the terminal, the message 3 further comprises a buffer status report, wherein the buffer status report is used to indicate an uplink data volume that needs to be uploaded by the terminal.

9. The method according to claim 8, wherein after receiving the message 3 sent by the terminal and before sending the network delivery competition and uplink resource allocation message to the terminal, the method further comprises, when a first message 3 sent by the terminal is received, modifying a data transmission bearer of a core network according to the message 3.

10. A base station, comprising:
a processor; and
a non-transitory computer-readable storage medium storing a program to be executed by the processor, the program including instructions for:
receiving a group identifier, a configuration information window length, and an offset between a start point of the configuration information window length and a paging occasion that are sent by a mobility management entity;
establishing a public data radio bearer to a terminal corresponding to the group identifier;
scrambling configuration information of the public data radio bearer by using a radio network temporary identifier;
sending a paging message carrying the group identifier and the radio network temporary identifier to the terminal;
sending the scrambled configuration information of the public data radio bearer to the terminal in the configuration information window length, so that after receiving the paging message, the terminal can calculate, according to the configuration information window length and the offset that are pre-obtained by the terminal, a position range where the scrambled configuration information of the public data radio bearer appears, obtain the scrambled configuration information of the public data radio bearer from the position range, and transmit uplink data on the public data radio bearer; and
receiving the uplink data transmitted by the terminal on the public data radio bearer.

11. The base station according to claim 10, wherein the program includes further instructions for:
receiving a radio bearer life cycle sent by the mobility management entity;
establishing a public data radio bearer having the radio bearer life cycle to the terminal corresponding to the group identifier; and
calculating a life cycle count value of the public data radio bearer.

12. The base station according to claim 11, wherein the program includes further instructions for calculating the life cycle count value of the public data radio bearer through the following formula:

$$DRB\text{LifeTimeCounter}=\text{floor}(DRB\text{LifeTime/Paging-Cycle})+1,$$

wherein the DRB Life Time Counter is the life cycle count value, the floor represents rounding down, the DRB Life Time is a life cycle of the public data radio bearer, the Paging Cycle is a paging cycle, and the paging cycle is preconfigured.

13. The base station according to claim 12, wherein the program includes further instructions for sending the paging message carrying the group identifier and the radio network temporary identifier to the terminal for a number of times that is smaller than or equal to the life cycle count value.

14. The base station according to claim 12, wherein the program includes further instructions for sending the scrambled configuration information of the public data radio bearer that carries the life cycle count value to the terminal in the configuration information window length, wherein the life cycle count value is a life cycle count value decreased by 1 after the paging message is sent each time.

15. The base station according to claim 11, wherein the program includes further instructions for sending the scrambled configuration information of the public data radio bearer to the terminal in the configuration information window length for at least once.

16. The base station according to claim 10, wherein the program includes further instructions for:
receiving an access preamble sent by the terminal, and return an access response to the terminal;
receiving a message 3 sent by the terminal, wherein the message 3 comprises the group identifier and a system architecture evolution temporary mobile station identifier S-TMSI, or the message 3 comprises the group identifier and a random number; and
sending a network delivery competition and uplink resource allocation message to the terminal, so that the terminal transmits the uplink data on a resource, which is indicated by the uplink resource allocation message, in the public data radio bearer.

17. The base station according to claim 16, wherein, when uplink data that needs to be uploaded by the terminal is larger than a default data volume of the network side that is pre-obtained by the terminal, the message 3 further comprises a buffer status report, wherein the buffer status report is used to indicate an uplink data volume that needs to be uploaded by the terminal.

18. The base station according to claim 17, wherein the program includes further instructions for, when a first message 3 sent by the terminal is received, modifying a data transmission bearer of a core network according to the message 3.

* * * * *